United States Patent
Takeda et al.

(10) Patent No.: US 10,432,254 B2
(45) Date of Patent: Oct. 1, 2019

(54) USER TERMINAL, RADIO BASE STATION AND RADIO COMMUNICATION METHOD

(71) Applicant: NTT DOCOMO, INC., Tokyo (JP)

(72) Inventors: Kazuaki Takeda, Tokyo (JP); Ruifeng Ma, Beijing (CN); Qin Mu, Beijing (CN); Liu Liu, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/894,676

(22) Filed: Feb. 12, 2018

(65) Prior Publication Data

US 2018/0183491 A1    Jun. 28, 2018

Related U.S. Application Data

(63) Continuation of application No. PCT/JP2016/073779, filed on Aug. 12, 2016.

(30) Foreign Application Priority Data

Aug. 13, 2015   (JP) .................................. 2015-159987

(51) Int. Cl.
*H04B 1/7156*   (2011.01)
*H04B 1/713*    (2011.01)
(Continued)

(52) U.S. Cl.
CPC ........... *H04B 1/7156* (2013.01); *H04B 1/713* (2013.01); *H04B 1/7143* (2013.01); *H04B 7/12* (2013.01);
(Continued)

(58) Field of Classification Search
CPC .... H04B 1/713; H04B 1/7143; H04B 1/7156; H04B 7/12; H04B 2001/71362;
(Continued)

(56) References Cited

U.S. PATENT DOCUMENTS

| | | | |
|---|---|---|---|
| 8,873,362 B2 | 10/2014 | Papasakellariou et al. | |
| 9,294,238 B2 | 3/2016 | Dahlman et al. | |

(Continued)

FOREIGN PATENT DOCUMENTS

| | | |
|---|---|---|
| JP | 2013-515427 A | 5/2013 |
| JP | 5242684 B2 | 7/2013 |

OTHER PUBLICATIONS

International Search Report issued in corresponding International Application No. PCT/JP2016/073779, dated Oct. 4, 2016 (2 pages).

(Continued)

*Primary Examiner* — David B Lugo
(74) *Attorney, Agent, or Firm* — Osha Liang LLP

(57) ABSTRACT

A user terminal is disclosed including a receiver that receives a downlink signal that is transmitted in repetitions in narrow bands to which frequency hopping is applied, and a processor that specifies a pattern of the applied frequency hopping based on a starting index that indicates a first narrow band in the narrow bands and a frequency offset that is a shift in a frequency direction from the first narrow band. The processor causes the receiver to receive the downlink signal using the specified pattern. Each of the narrow bands is a part of a system band. The user terminal communicates using the narrow bands only. The downlink signal starts being allocated to the first narrow band.

13 Claims, 18 Drawing Sheets

(51) Int. Cl.
*H04B 7/12* (2006.01)
*H04W 16/28* (2009.01)
*H04W 72/04* (2009.01)
*H04B 1/7143* (2011.01)
*H04B 1/7136* (2011.01)

(52) U.S. Cl.
CPC .......... *H04W 16/28* (2013.01); *H04W 72/04* (2013.01); *H04B 2001/71362* (2013.01); *H04B 2001/71563* (2013.01); *H04W 72/042* (2013.01)

(58) Field of Classification Search
CPC ........ H04B 2001/71563; H04W 16/28; H04W 72/04; H04W 72/042
See application file for complete search history.

(56) References Cited

U.S. PATENT DOCUMENTS

| | | | | |
|---|---|---|---|---|
| 2011/0235684 | A1* | 9/2011 | Dahlman | H04B 1/59 375/135 |
| 2013/0250869 | A1* | 9/2013 | Eriksson | H04W 72/1231 370/329 |
| 2016/0226639 | A1* | 8/2016 | Xiong | H04L 5/0053 |
| 2018/0069593 | A1* | 3/2018 | Yi | H04B 1/713 |
| 2018/0198574 | A1* | 7/2018 | Papasakellariou | H04W 48/12 |

OTHER PUBLICATIONS

Written Opinion issued in corresponding International Patent Application No. PCT/JP2016/073779, dated Oct. 4, 2016 (3 pages).
3GPP TS 36300 v12.4.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", Dec. 2014 (251 pages).
3GPP TR 36.888 V12.0.0, "3rd Generation Partnership Project; Technical Specification Group Radio Access Network; Study on provision of low-cost Machine-Type Communications (MTC) User Equipments (UEs) based on LTE (Release 12)", Jun. 2013 (55 pages).
Office Action issued in corresponding Japanese Patent Application No. 2015-159987, dated Sep. 20, 2016 (5 pages).
Extended European Search Report issued in the counterpart European Patent Application No. 16835245.8, dated Jul. 30, 2018 (9 pages).
LG Electronics; "Discussions on frequency hopping and subband for Rel-13 MTC UEs"; 3GPP TSG RAN WG1 Meeting #80bis R1-151486; Belgrade, Serbia, Apr. 20-24, 2015 (5 pages).
ZTE; "PRB group definition and frequency hopping for MTC enhancement"; 3GPP TSG RAN WG1 Meeting #81 R1-152954; Fukuoka, Japan, May 25-29, 2015 (6 pages).
3GPP TR 45.820 V1.1.0; "3rd Generation Partnership Project; Technical Specification Group GSM/EDGE Radio Access Network; Cellular System Support for Ultra Low Complexity and Low Throughput Internet of Things; (Release 13)"; Apr. 2015 (147 pages).

* cited by examiner

USER TERMINAL, RADIO BASE STATION AND RADIO COMMUNICATION METHOD

CROSS-REFERENCE TO RELATED APPLICATIONS

The present application is a continuation of application of PCT Application No. PCT/JP2016/073779, filed on Aug. 12, 2016, which claims priority to Japanese Patent Application No. 2015-159987, filed on Aug. 13, 2015. The contents of the international and priority applications are hereby incorporated by reference in their entirety.

TECHNICAL FIELD

One or more embodiments disclosed herein relate to a user terminal, a radio base station and a radio communication method in next-generation mobile communication systems.

BACKGROUND

In the Universal Mobile Telecommunications System (UMTS) network, the specifications of long term evolution (LTE) have been drafted for the purpose of further increasing high speed data rates, providing lower delays and so on (see non-patent literature 1). Also, successor systems of LTE (referred to as, for example, "LTE-Advanced (LTE-A)", "Future Radio Access (FRA)", "4G," "5G," and so on) are under study for the purpose of achieving further broadbandization and increased speed beyond LTE.

Now, accompanying the cost reduction of communication devices in recent years, active development is in progress in the field of technology related to machine-to-machine communication (M2M) to implement automatic control of network-connected devices and allow these devices to communicate with each other without involving people. In particular, 3rd Generation Partnership Project (3GPP) is promoting the standardization of Machine-Type Communication (MTC) for cellular systems for machine-to-machine communication, among all M2M technologies (see non-patent literature 2). User terminals for MTC (MTC User Equipment (UE)) are being studied for use in a wide range of fields such as, for example, electric meters, gas meters, vending machines, vehicles and other industrial equipment.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

Non-Patent Literature 2: 3GPP TS 36.888 "Study on provision of low-cost Machine-Type Communications (MTC) User Equipments (UEs) based on LTE (Release 12)"

SUMMARY

In accordance with embodiments of the present invention, a user terminal includes a receiver that receives a downlink signal that is transmitted in repetitions using narrow bands to which frequency hopping is applied, and a processor that specifies a pattern of the applied frequency hopping based on a starting index that indicates a first narrow band in the narrow bands and a frequency offset that is a shift in a frequency direction from the first narrow band, and causes the receiver to receive the downlink signal using the specified pattern. Each of the narrow bands is a part of a system band. The user terminal communicates using the narrow bands only. The downlink signal starts being allocated to the first narrow band.

In some aspects, the receiver receives information that represents the frequency offset via higher layer signaling.

In some aspects, the receiver receives downlink control information that contains the starting index.

In some aspects, the receiver receives a number of the narrow bands to which the frequency hopping is applied via higher layer signaling.

In some aspects, the downlink signal is at least one of a downlink shared channel and a downlink control channel.

In accordance with embodiments of the present invention, a radio base station includes a transmitter that transmits, to a user terminal, a downlink signal, in repetitions, using narrow bands to which frequency hopping is applied, and a processor that determines a pattern of the applied frequency hopping based on a starting index that indicates a first narrow band in the narrow band and a frequency offset that is a shift in a frequency direction from the first narrow band, and causes the transmitter to transmit the downlink signal using the determined pattern. Each of the narrow bands is a part of a system band. The user terminal communicates using the narrow bands only. The downlink signal starts being allocated to the first narrow band.

In accordance with embodiments of the present invention, a radio communication method for a user terminal includes receiving, from a base station, a downlink signal that is transmitted in repetitions in narrow bands to which frequency hopping is applied, and specifying a pattern of the applied frequency hopping based on a starting index that indicates a first narrow band in the narrow bands and a frequency offset that is a shift in a frequency direction from the first narrow band. The receiving receives the downlink signal using the specified pattern. Each of the narrow bands is a part of a system band. The user terminal communicates using the narrow bands only. The downlink signal starts being allocated to the first narrow band.

According to one or more embodiments of the present invention, when a downlink signal is transmitted in repetitions to a user terminal that is limited to using partial frequency blocks in a system band as bands for its use, the downlink signal can achieve a frequency diversity effect.

DETAILED DESCRIPTION

Figure 1:
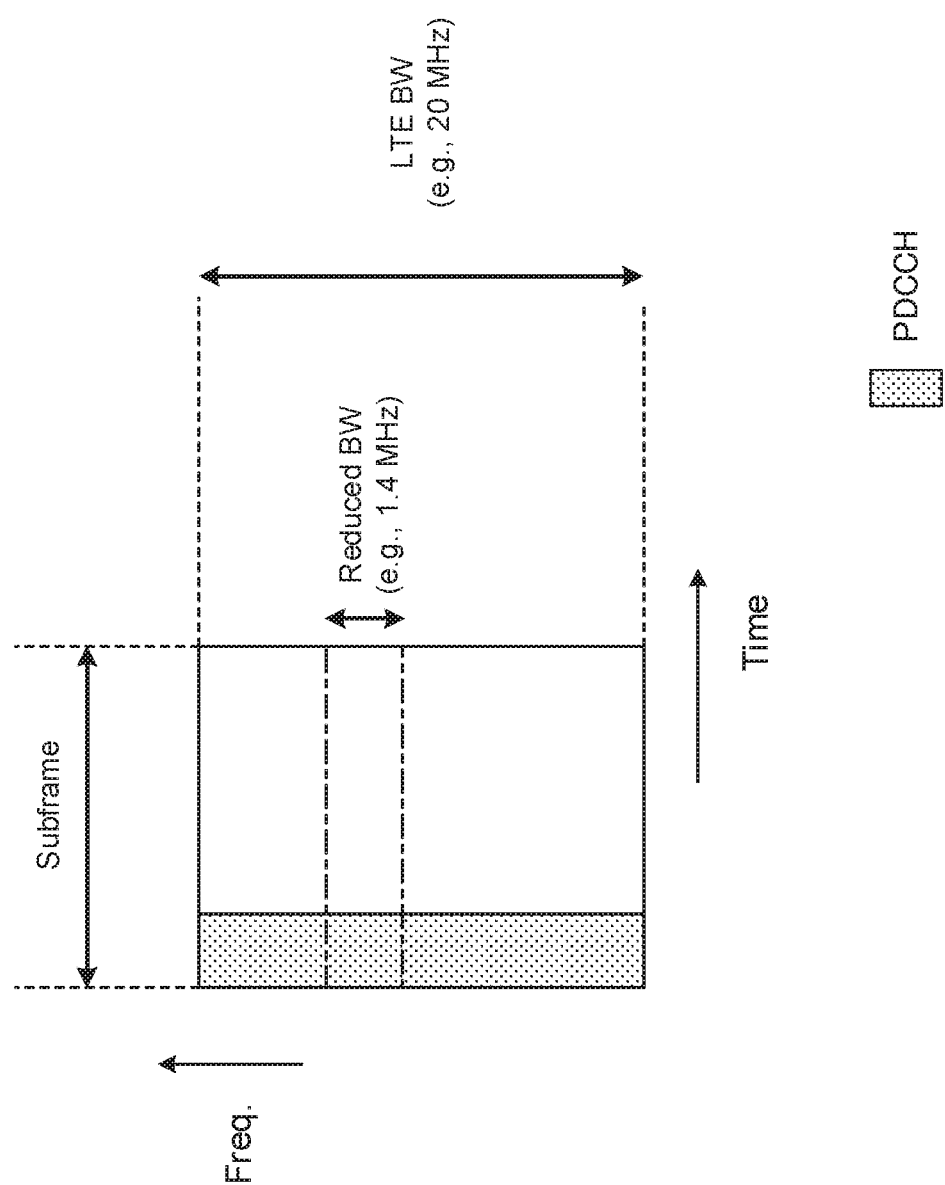
FIG. 1 is a diagram to explain the bands for use for LTE terminals and MTC terminals.

From the perspective of reducing the cost and improving the coverage area in cellular systems, in MTC, user terminals for MTC (Low-Cost (LC)) MTC UEs, hereinafter referred to simply as "MTC terminals") that can be implemented in simple hardware structures have been increasingly in demand. MTC terminals can be implemented by limiting the uplink (UL) band and the downlink (DL) band to partial frequency blocks in a system band. These frequency blocks are formed to be, for example, 1.4 MHz, and are also referred to as "narrow bands" (NBs).

Furthermore, in MTC, a study is in progress to make repetitious transmission ("repetition"), in which the same downlink signal is transmitted over a plurality of subframes, for enhanced coverage (coverage enhancement). However, when repetitious transmission is made within the same frequency block, a frequency diversity effect cannot be gained, and therefore there is a threat that the number of repetitions required to fulfill the desired signal-to-interference-plus-noise ratio (SINR) might increase.

One or more embodiments of the present invention provide a user terminal, a radio base station and a radio communication method, whereby a downlink signal can achieve a frequency diversity effect when the downlink signal is transmitted in repetitions to a user terminal that is limited to using partial frequency blocks in a system band as bands for its use.

In accordance with embodiments of the invention, a user terminal, in which the band to use is limited to partial narrow bands in a system band, includes a receiving section that receives a downlink signal, which is transmitted in repetitions in narrow bands that are subject to frequency hopping. The user terminal includes a control section that controls receipt of the downlink signal based on a starting index and a frequency offset with respect to a narrow band. The starting index indicates the narrow band where the downlink signal starts being allocated.

In accordance with embodiments of the invention, a radio base station communicates with a user terminal, in which a band to use is limited to a partial narrow band in a system band. The radio base station includes a transmission section that transmits a downlink signal, in repetitions, in narrow bands that are subject to frequency hopping. The radio base station includes a control section that controls transmission of the downlink signal based on a starting index and a frequency offset with respect to a narrow band. The starting index indicates the narrow band where the downlink signal starts being allocated.

In accordance with embodiments of the invention, a radio communication method for a user terminal, in which a band to use is limited to a partial narrow band in a system band, includes receiving a downlink signal, which is transmitted in repetitions in narrow bands that are subject to frequency hopping. The radio communication method includes controlling receipt of the downlink signal based on a starting index and a frequency offset with respect to a narrow band. The starting index indicates the narrow band where the downlink signal starts being allocated.

Studies are in progress to simplify the hardware structures of low-cost MTC terminals at the risk of lowering their processing capabilities. For example, studies are in progress to apply limitations to low-cost MTC terminals, in comparison to existing user terminals, by, for example, lowering the peak rate, limiting the transport block size (TBS), limiting the resource blocks (also referred to as "RBs," "Physical Resource Blocks (PRBs)") and so on (hereinafter referred to as "PRBs")), limiting the Radio Frequencies (RFs) to receive, and so on.

Here, existing user terminals are referred to as "LTE terminals," "LTE-A terminals," "LTE User Equipments (UEs)", "normal UEs," and "non-MTC terminals," or may be referred to simply as "user terminals," "UEs," and so on. Also, MTC terminals are referred to simply as "user terminals," "UEs" and so on. Hereinafter, for ease of explanation, existing user terminals will be referred to as "LTE terminals," and user terminals for MTC (low-cost MTC) will be referred to as "MTC terminals."

FIG. 1 is a diagram to explain the bands for use for LTE terminals and MTC terminals. As shown in FIG. 1, the maximum band for use for LTE terminals is configured to a system band (for example, 20 MHz (=100 PRBs), one component carrier, and so on). By contrast, the maximum band for use for MTC terminals is limited to a partial frequency block in a system band (for example, 1.4 MHz (=6 PRBs)). Hereinafter, this frequency block will be also referred to as a "narrow band" (NB).

Furthermore, there is an ongoing study to run MTC terminals in the system bands of LTE/LTE-A. In this case, frequency-division-multiplexing of MTC terminals and LTE terminals can be supported. In this way, MTC terminals may be seen as terminals that support only a partial frequency block (e.g., narrow band) in a system band as the maximum band they can support, and seen as user terminals that have the functions to transmit and receive in a narrower band than the system bands of LTE/LTE-A.

Figure 2:
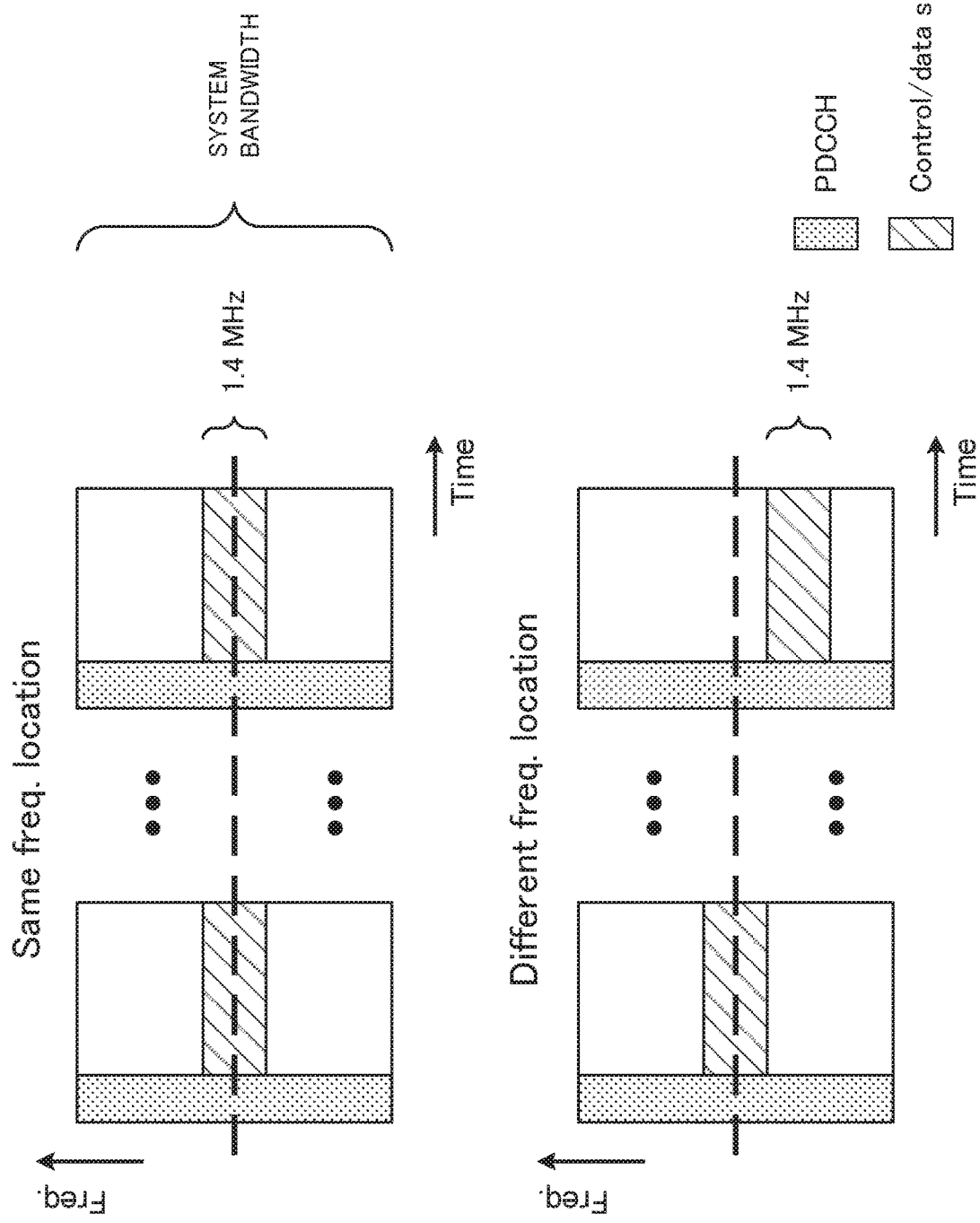
FIG. 2A and FIG. 2B provide diagrams to explain the arrangement of a narrow band that serves as a band for use for MTC terminals.

FIGS. 2 provide diagrams to explain the arrangement of a narrow band that serves as a band for use for MTC terminals. As shown in FIG. 2A, a narrow band (for example, 1.4 MHz) may be fixed in a specific frequency location in a system band (for example, 20 MHz). In this case, there is a threat that the traffic concentrates in a specific frequency (for example, the center frequency). Furthermore, since no frequency diversity effect can be achieved, the spectral efficiency might decrease.

So, as shown in FIG. 2B, it may be possible to move a narrow band (for example, 1.4 MHz) to different frequency locations (frequency resources) in a system band (for example, 20 MHz) every fixed period (every subframe, for example). In this case, the traffic of MTC terminals can be spread out. Furthermore, since a frequency diversity effect can be achieved, it is possible to reduce the decrease of spectral efficiency.

As shown in FIG. 2B, when the frequency location of a narrow band that serves as a band for use for MTC terminals is variable, considering that frequency hopping, frequency scheduling and so on may be applied to the narrow band, MTC terminals should preferably have an RF re-tuning function.

Now, MTC terminals support only a partial narrow band (for example, 1.4 MHz) in a system band, and cannot detect a downlink control channel (Physical Downlink Control Channel (PDCCH)) that is arranged over the whole system band. Consequently, a study is in progress to allocate resources for a downlink shared channel (PDSCH), an uplink shared channel (Physical Uplink Shared Channel (PUSCH)) and so on, by using a downlink control channel for MTC (Machine type communication PDCCH (MPDCCH)) that is arranged in a narrow band.

Here, the MTC downlink control channel (MPDCCH) is a downlink control channel that is transmitted in a partial narrow band in a system band, and may be frequency-division-multiplexed with a downlink shared channel (Physical Downlink Shared Channel (PDSCH)) for LTE or MTC. The MPDCCH may be referred to as a "Machine-type communication PDCCH (M-PDCCH)", an "enhanced downlink control channel" (Enhanced Physical Downlink Control Channel (EPDCCH)) and so on. Downlink control information (DCI) to include information regarding PDSCH allocation (for example, downlink (DL) grants), information regarding PUSCH allocation (for example, uplink (UL) grants) and suchlike information is communicated by the MPDCCH.

Note that, other than the MPDCCH, any channel that is used by MTC terminals may be represented by affixing an "M," which stands for MTC, to the existing channel that is used for the same purpose. For example, a PDSCH that is allocated by an MPDCCH may be referred to as a "Machine type communication PDSCH (MPDSCH)", a "Machine-type communication PDSCH (M-PDSCH)", and so on. Similarly, a PUSCH that is allocated by an "MPDCCH" may be referred to as a "Machine type communication PUSCH (MPUSCH)"), a "Machine-type communication PUSCH (M-PUSCH)", and so on.

Now, in MTC, a study is in progress to use repetitious transmission/receipt, in which the same downlink signal and/or uplink signal are transmitted/received in repetitions over a plurality of subframes, for enhanced coverage. Note that the number of a plurality of subframes where the same downlink signal and/or uplink signal are transmitted and received is also referred to as "the number of repetitions" (or the "repetition number"). Also, the number of repetitions may be represented by the repetition level. This repetition level is also referred to as "the coverage enhancement (CE) level."

When a downlink signal is transmitted to an MTC terminal in repetitions, the MTC terminal combines the downlink signals received in a plurality of subframes. Consequently, even when a partial narrow band in a system band is used, the desired SINR can be fulfilled. On the other hand, when a downlink signal for an MTC terminal is transmitted in repetitions in the same narrow band, a frequency diversity effect cannot be gained, and therefore there is a threat the number of repetitions required to fulfill the desired SINR might increase.

So, frequency hopping is under study to be applied to a downlink signal (for example, the PDSCH), when the downlink signal is transmitted to an MTC terminal in repetitions, to gain a frequency diversity effect.

Figure 3:
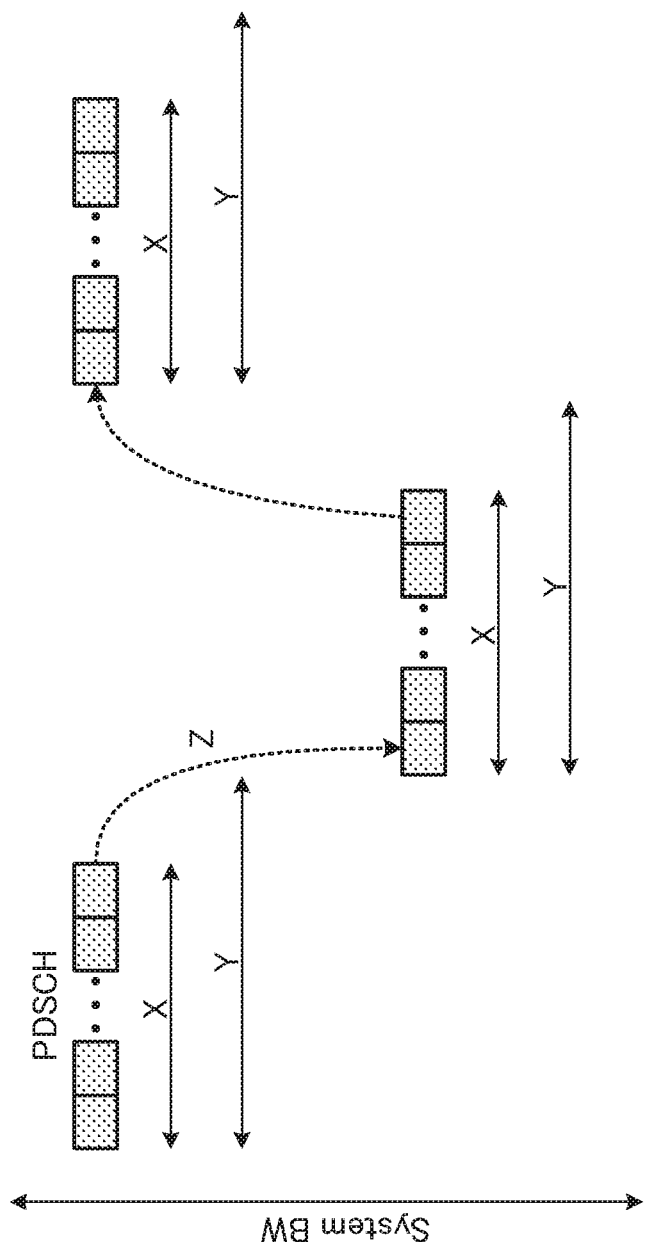
FIG. 3 is a diagram to show an example of a frequency hopping pattern.

FIG. 3 is a diagram to show an example of a frequency hopping pattern. The frequency hopping pattern shown in FIG. 3 can be specified by a period X, in which transmission is repeated in the same narrow band (frequency block), a period Y, which is a total of period X and the period (for example, 1 ms) it takes to re-tune to another narrow band, and Z, which is an offset between narrow bands in the frequency direction (hereinafter referred to as "hopping offset"). Note that periods X and Y are common in all MTC terminals that employ frequency hopping. Also, since a subframe is 1 ms, period X is equal to the number of repetitions in the same narrow band.

Now, frequency hopping to use periods X and Y and hopping offset Z will be described in detail with reference to FIG. 4 and FIG. 5. Also, in FIG. 4 and FIG. 5, the retuning period upon hopping to other narrow bands is not illustrated. Furthermore, although the system band is comprised of 8 narrow bands (NBs #0 to #7) in FIG. 4 and FIG. 5, this is by no means limiting.

Figure 4:
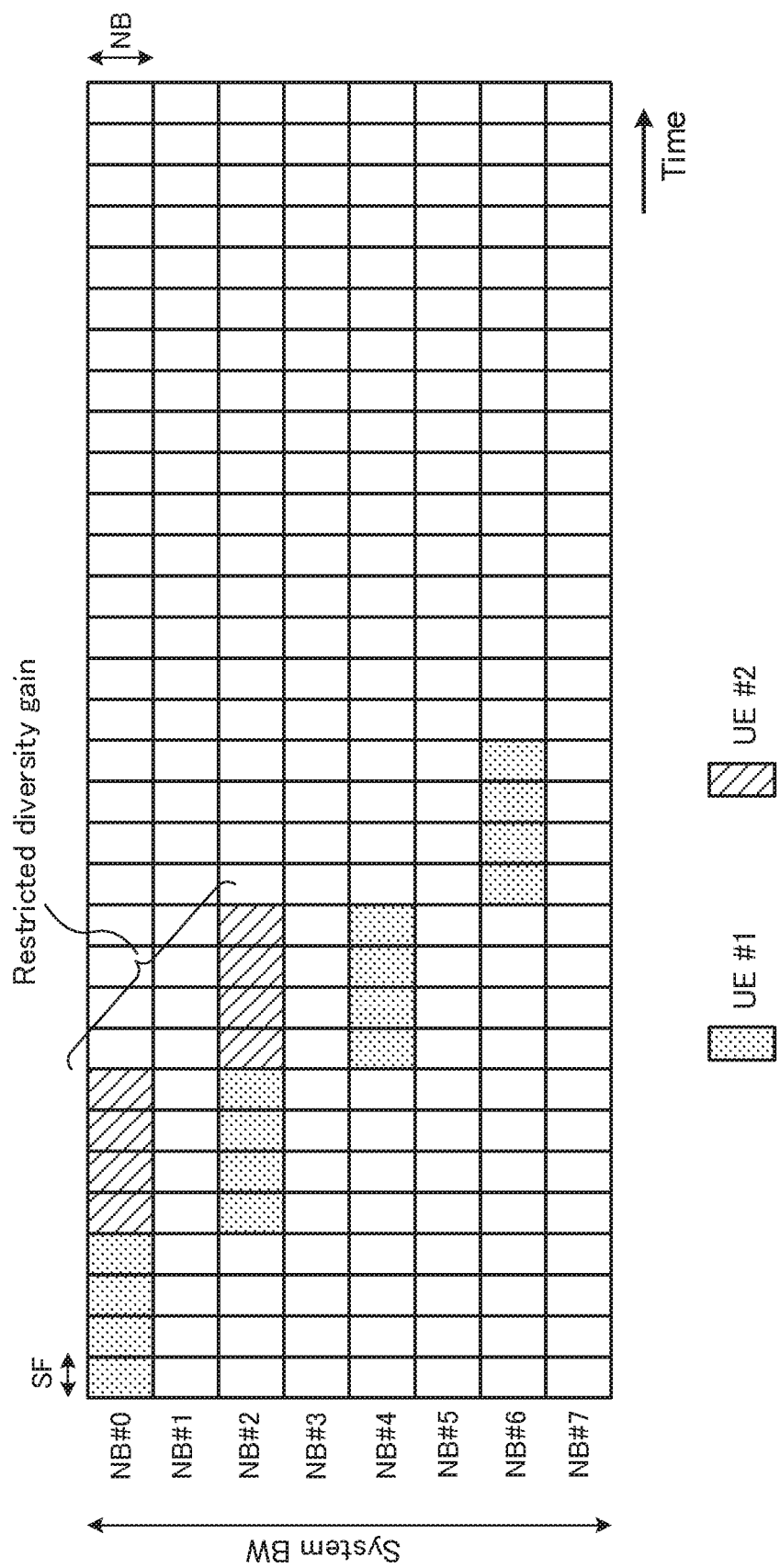
FIG. 4 is a diagram to show other examples of frequency hopping patterns.

FIG. 4 shows, as an example, a frequency hopping pattern that is specified by X=4, Y=5 and Z=2. In FIG. 4, periods X and Y and hopping offset Z are common in all MTC terminals that employ frequency hopping.

Referring to FIG. 4, when the number of repetitions of the PDSCH for MTC terminal (UE) #1 is 16, the downlink signal (e.g., PDSCH) for MTC terminal #1 is allocated 4 NBs (#0, #2, #4 and #6) that each hop 2 NBs every 4 subframes. Furthermore, when the number of repetitions of the PDSCH for MTC terminal (UE) #2 is 8, the PDSCH for MTC terminal #2 is allocated to 2 NBs (#0 and #2) that each hop 2 NBs every 4 subframes.

To each MTC terminal, an index to represent the narrow band (NB) where the PDSCH starts being allocated ("starting NB index," and hereinafter referred to as the "starting index") is reported. Here, the starting index is reported by using DCI (for example, DCI that contains PDSCH allocation information (downlink grant)) that is communicated in an MPDCCH, higher layer signaling, and so on. Each MTC terminal specifies the frequency hopping pattern of the PDSCH based on the starting index, periods X and Y and hopping offset Z. Here, periods X and Y and hopping offset Z may be reported in higher layer signaling, or may be provided in the specification in advance.

Meanwhile, when, as shown in FIG. 4, periods X and Y and hopping offset Z are common among all MTC terminals that employ frequency hopping, the PDSCH for an MTC terminal where the number of repetitions is small has difficulty gaining a frequency diversity effect. For example, the PDSCH for MTC terminal #2 in FIG. 4 is transmitted only in 2 NBs (#0 and #2), and therefore has difficulty gaining a frequency diversity effect when compared to the PDSCH for MTC terminal #1, which is transmitted in 4 NBs (#0, #2, #4 and #6).

As a method of gaining a frequency diversity effect even when the number of repetitions is small, for example, it may be possible to control hopping offset Z adaptively. In the frequency hopping patterns shown in FIG. 5, hopping offset Z is controlled based on the number of repetitions.

Figure 5:
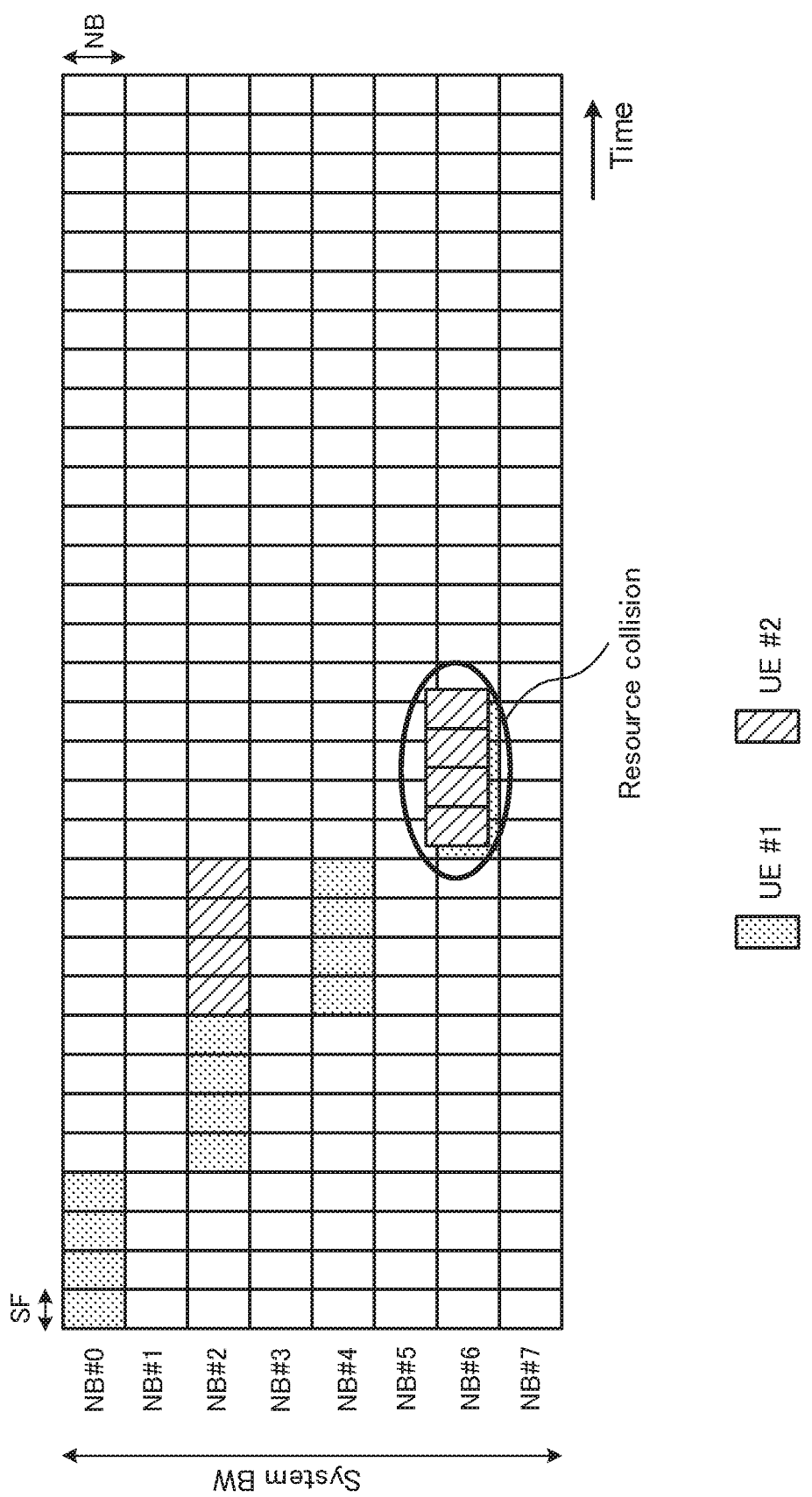
FIG. 5 is a diagram to show other examples of frequency hopping patterns.

In FIG. 5, hopping offset Z for MTC terminal (UE) #1 is 2 when the number of repetitions is 16. On the other hand, hopping offset Z is 4 for MTC terminal #2 where the number of repetitions is 8. In this way, it becomes easier to gain a frequency diversity effect by making hopping offset Z greater as the number of repetitions becomes smaller.

However, when hopping offset Z is controlled in order to gain a frequency diversity effect, there is a threat that, as shown in FIG. 5, the resources to allocate a plurality of MTC terminals' PDSCHs collide with each other (FIG. 5 shows a collision in NB #6). In this way, there is a feat that, even when an attempt is made to improve the frequency diversity effect by using the above-described frequency hopping patterns, the resources to allocate downlink signals (for example, PDSCHs) for a plurality of MTC terminals might collide.

In view of the abvoe, accoding to one or more embodiments of the present invention, in the case where downlink signals (for example, PDSCHs) are transmitted to MTC terminals in repetitions, it is possible to reduce the collisions of resources allocated to downlink signals for a plurality of MTC terminals, while gaining a frequency diversity effect.

The radio communication method according to one or more embodiments of the present invention will be described below. Note that, although, in the following description, a partial narrow band (frequency block) in a system band will be illustrated to be 1.4 MHz and formed with 6 resource blocks (PRBs), this is by no means limiting. Also, although, in the following description, the system band will be formed with 8 narrow bands (NBs), this is by no means limiting. Furthermore, although the downlink signals in the following description will be the PDSCH, this is by no means limiting, and one or more embodiments of the present invention may be equally applicable to various downlink signal and uplink signals.

Also, although cases where X=4 and Y=5 will be described as examples with reference to FIGS. 6 to 12, these are by no means limiting. Note that the retuning period (1 ms) is not illustrated in FIGS. 6 to 12. Furthermore, the indices assigned to the 8 narrow bands (NBs) in FIGS. 6 to 12 are simply examples, and are by no means limiting.

FIRST EXAMPLE

According to a First Example, an MTC terminal (user terminal) receives a PDSCH (downlink signal) that is transmitted in repetitions in a pre-determined frequency hopping pattern, and specifies the frequency hopping pattern that is applied to this PDSCH. To be more specific, the MTC terminal receives a starting index that indicates the narrow band (frequency block) where the PDSCH starts being allocated, and, based on this starting index and the time offset for this PDSCH allocation-starting subframe, specifies the frequency hopping pattern that is applied to the PDSCH.

Here, information to indicate the above time offset may be reported to the MTC terminal by higher layer signaling (for example, RRC signaling, broadcast information, etc.), may be included in DCI that is communicated to the MTC terminal in an MPDCCH, or may be configured in the MTC terminal in advance. Also, the starting index is included in DCI that is communicated to the MTC terminal in an MPDCCH.

Figure 6:
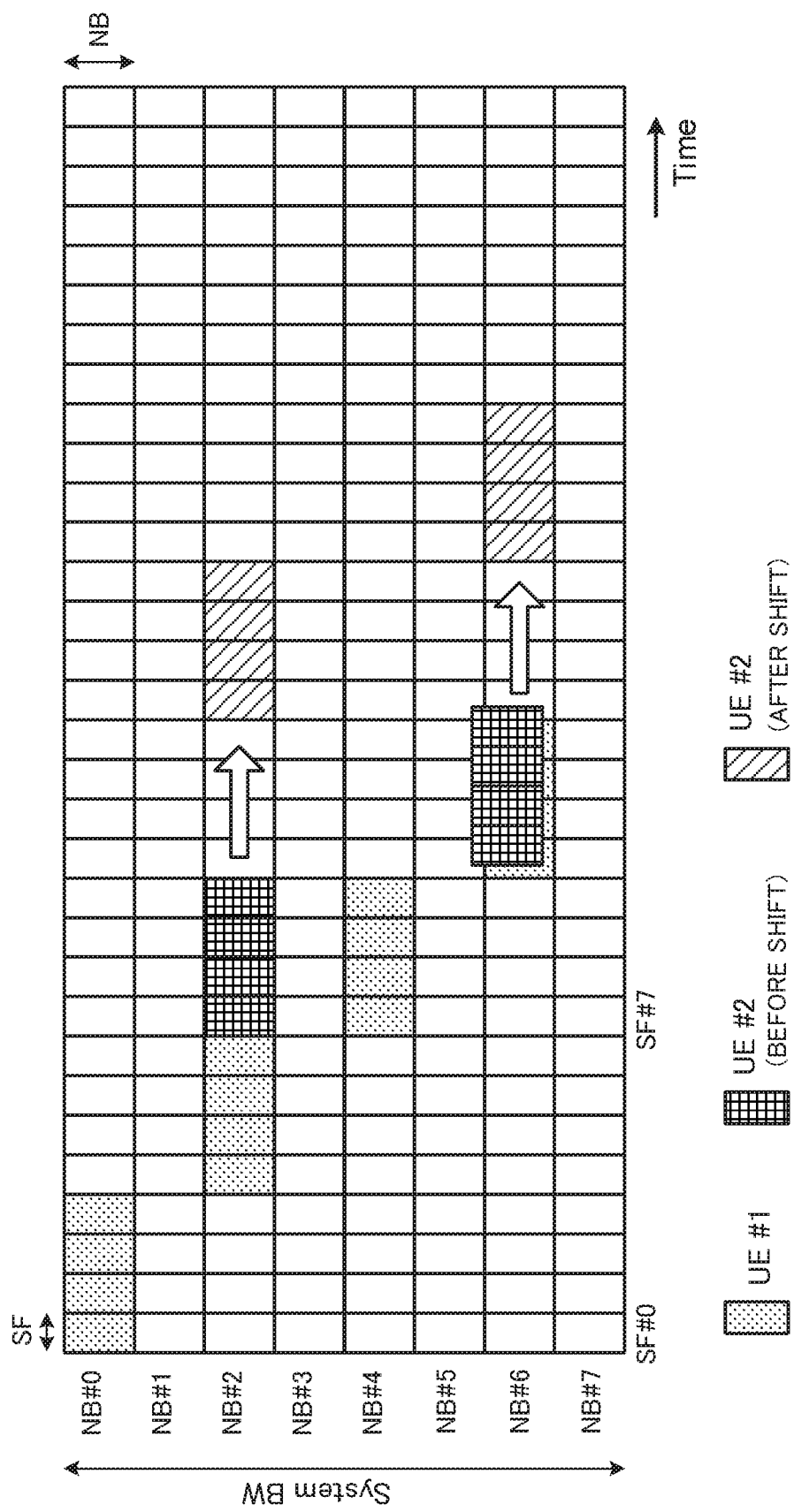
FIG. 6 is a diagram to show examples of frequency hopping patterns according to a First Example in accordance with embodiments of the invention.

FIG. 6 is a diagram to show examples of frequency hopping patterns according to the First Example. Assume that, in FIG. 6, X and Y are common in all MTC terminals that employ frequency hopping. X and Y may be configured in advance, or may be reported to the MTC terminals by way of higher layer signaling. Also, Z may be controlled based on the number of repetitions, and may be reported to the MTC terminals by higher layer signaling or by an MPDCCH, or may be determined by the MTC terminals based on the number of repetitions.

In FIG. 6, the time offset for the starting subframe where the PDSCH for MTC terminal #2 starts being allocated is configured 4. Also, the starting index to indicate the narrow band where the PDSCH for MTC terminal #2 starts being allocated is #2. Based on this time offset, MTC terminal #2 applies a 4-subframe shift, in the direction of time, to the frequency hopping pattern specified by the above starting index #2, X=4, Y=5 and Z =4. By means of this time offset-based shift, it is possible to prevent MTC terminals #1 and #2 from colliding in narrow band (NB) #6.

According to the First Example, a frequency hopping pattern is shifted in the direction of time by a time offset, so that it is possible to reduce the collisions of PDSCH allocation resources between MTC terminals even when hopping offset Z is controlled based on the number of repetitions in order to gain a frequency diversity effect.

SECOND EXAMPLE

According to a Second Example, an MTC terminal receives a starting index that indicates the narrow band (frequency block) where the PDSCH starts being allocated, and, based on this starting index and the frequency offset for the narrow band (frequency block) indicated by this starting index, specifies the frequency hopping pattern that is applied to the PDSCH. The Second Example is different from the First Example in that a frequency offset is used instead of a time offset. Note that the Second Example can be combined with the First Example, and can use both a time offset and a frequency offset. Now, the Second Example will be described, primarily focusing on differences from the First Example.

Here, information to indicate the above time offset may be reported to the MTC terminal by higher layer signaling (for example, RRC signaling), may be included in DCI that is communicated to the MTC terminal in an MPDCCH, or may be configured in the MTC terminal in advance.

Figure 7:
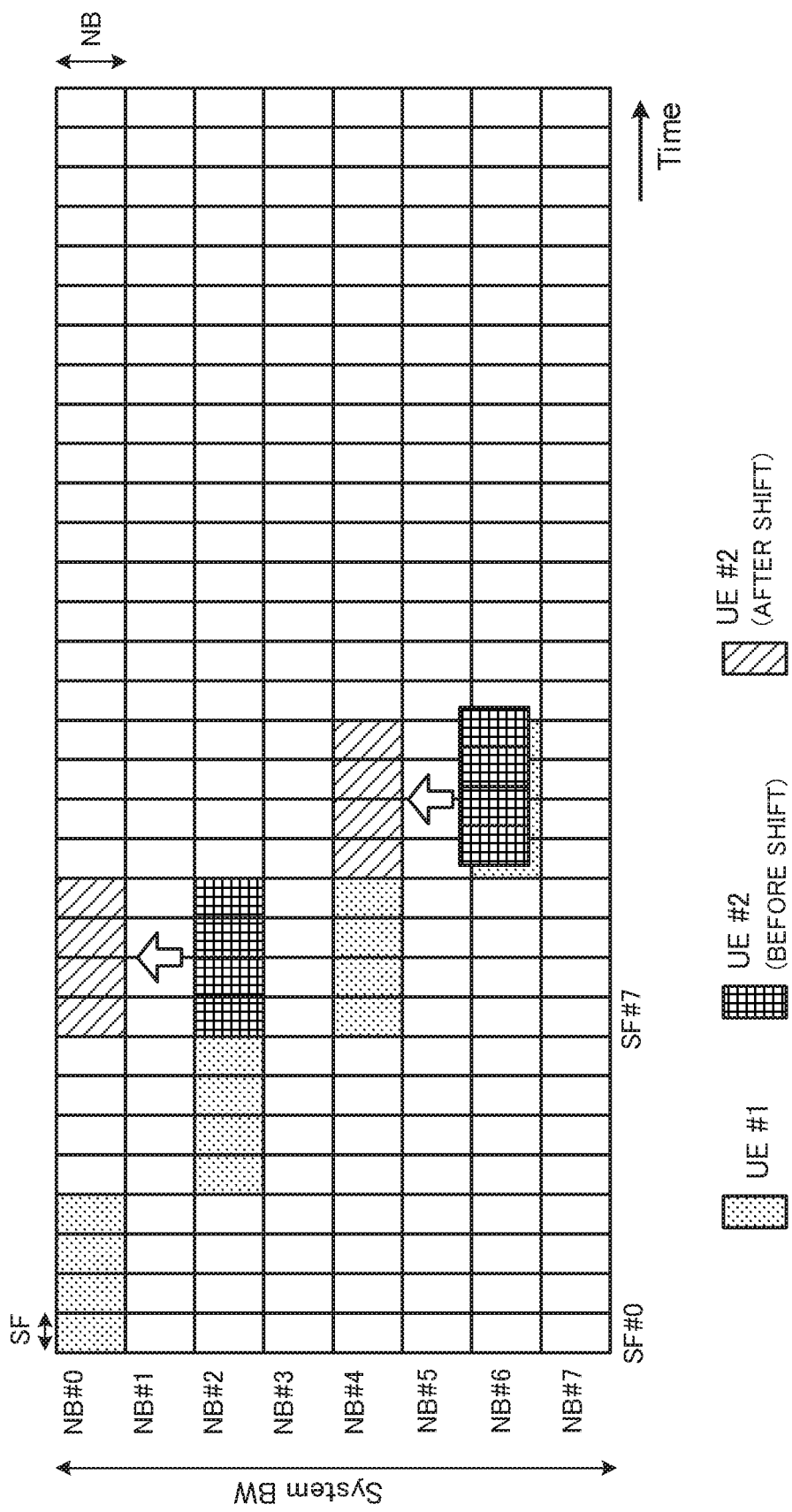
FIG. 7 is a diagram to show examples of frequency hopping patterns according to a Second Example in accordance with embodiments of the invention.

FIG. 7 is a diagram to show examples of frequency hopping patterns according to the Second Example. In FIG. 7, the frequency offset for narrow band (#2) indicated by the starting index for MTC terminal #2 is configured 2. MTC terminal #2 applies a 2-NB shift, in the direction of frequency, to the frequency hopping pattern specified by the above starting index #2, X=4, Y=5 and Z=4. By means of this frequency offset-based shift, it is possible to prevent MTC terminals #1 and #2 from colliding in NB #6.

According to the Second Example, a frequency hopping pattern is shifted in the direction of frequency by a frequency offset, so that it is possible to reduce the collisions of PDSCH allocation resources between MTC terminals even when hopping offset Z is controlled based on the number of repetitions in order to gain a frequency diversity effect. cl THIRD EXAMPLE According to a Third Example, an MTC terminal (user terminal) receives a PDSCH (downlink signal) that is transmitted in repetitions in a pre-determined frequency hopping pattern, and specifies the frequency hopping pattern that is applied to this PDSCH. To be more specific, the MTC terminal receives a starting index that indicates the narrow band (frequency block) where the PDSCH starts being allocated, and, based on this starting index, specifies the frequency hopping pattern that is applied to the PDSCH, from the frequency hopping patterns that are determined in advance (pre-determined) among a plurality of narrow bands configured by higher layer signaling.

Here, in the above pre-determined frequency hopping patterns, the narrow band to allocate a PDSCH may be interleaved every fixed number of subframes across the multiple narrow bands configured by higher layer signaling.

Also, in the pre-determined frequency hopping patterns, frequency hopping sets that are designed so that the PDSCH of the minimum number of repetitions (for example, 8) is allocated to at least two narrow bands may be configured. The MTC terminal receives a PDSCH that is transmitted in repetitions, by using at least one frequency hopping set that suits to the number of repetitions.

Figure 8:
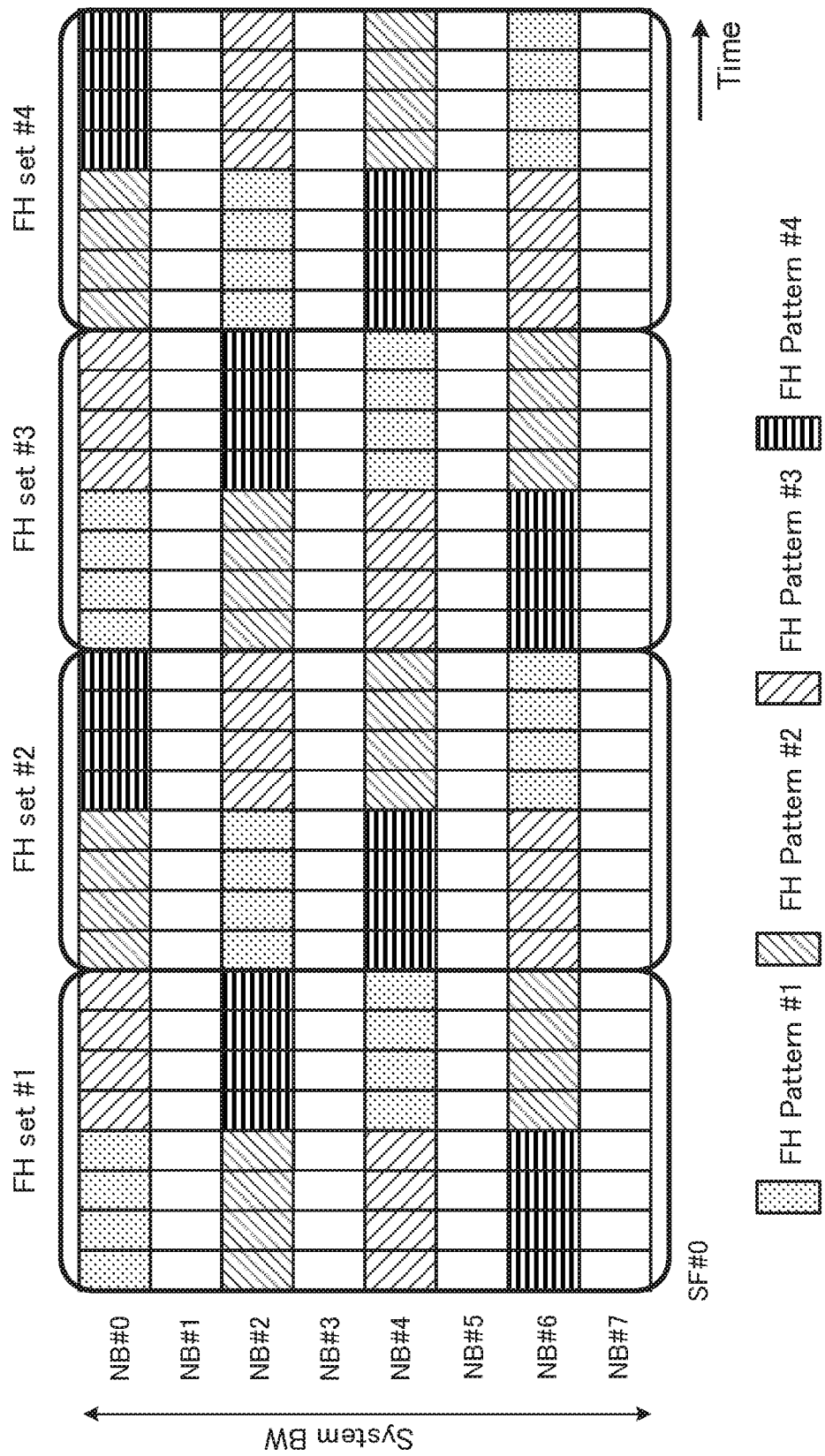
FIG. 8 is a diagram to show examples of frequency hopping patterns according to a Third Example in accordance with embodiments of the invention.

FIG. 8 is a diagram to show examples of frequency hopping patterns according to the Third Example. In FIG. 8, frequency hopping (FH) patterns #1 to #4 are pre-determined, and configured in the MTC terminal. Frequency hopping (FH) patterns #1 to #4 may be determined based on pre-determined parameters (such as information provided in higher layer signaling (for example, cell-specific information), fixed values, etc.).

In FIG. 8, 4 NBs (#1, #3, #4 and #8) are configured by higher layer signaling as narrow bands (NBs) for frequency hopping. FIG. 8 shows the state where above frequency hopping patterns #1 to #4 are applied to the 4 NBs configured by higher layer signaling. In this way, according to the Third Example, frequency hopping patterns that are determined in advance or that are determined based on specific parameters such as the number of NBs are applied to a plurality of narrow bands configured by higher layer signaling.

Furthermore, in frequency hopping patterns #1 to #4 shown in FIG. 8, the narrow band to allocate a PDSCH is interleaved every fixed number of subframes across a plurality of narrow bands configured by higher layer signaling. For example, in frequency hopping pattern #1 in FIG. 8, the PDSCH is allocated (mapped) to different NBs every 4 subframes, which goes like: NB #0→>NB #4→NB #2→>NB #6.

In FIG. 8, an MTC terminal specifies the frequency hopping pattern that is applied to the PDSCH, from frequency hopping patterns #1 to #4, based on the above starting index. To be more specific, the MTC terminal receives, via an MPDCCH, DCI that contains the starting index. For example, in FIG. 8, when the MTC terminal receives DCI that contains starting index #2 in subframe #0, the MTC terminal specifies frequency hopping pattern #2 based on this starting index #2. Here, the starting index may be reported in higher layer signaling and so on.

Also, in the frequency hopping patterns shown in FIG. 8, frequency hopping sets that are designed so that the PDSCH of the minimum number of repetitions (here, 8) is allocated to at least two narrow bands may be configured. For example, FIG. 8, a PDSCH is allocated to different NBs every 4 subframes, so that frequency hopping sets (FH sets #1 to #4) are configured every 8 subframes.

For example, in FIG. 8, frequency hopping set #1 alone is assigned to the PDSCH where the number of repetitions is 8. Also, two frequency hopping sets #1 and #2 are assigned to the PDSCH where the number of repetitions is 16. Furthermore, to the PDSCH where the number of repetitions is 32, four frequency hopping sets #1 to #4 are assigned. This assignment of frequency hopping sets may be reported to the MTC terminal by higher layer signaling or by an MPDCCH, or may be estimated by the MTC terminal based on the number of repetitions.

According to the Third Example, frequency hopping patterns, in which the allocating narrow band is interleaved every fixed number of subframes, are pre-determined, and these frequency hopping patterns are applied to a plurality of narrow bands that are configured by higher layer signaling. To be more specific, a plurality of narrow bands that are distributed over the system band are configured by higher layer signaling, and frequency hopping patterns that are determined in advance so as to prevent collisions are applied to these multiple narrow bands. By this means, it is possible to prevent the collisions of PDSCH resources between MTC terminals, while improving the frequency diversity effect.

Figure 18:
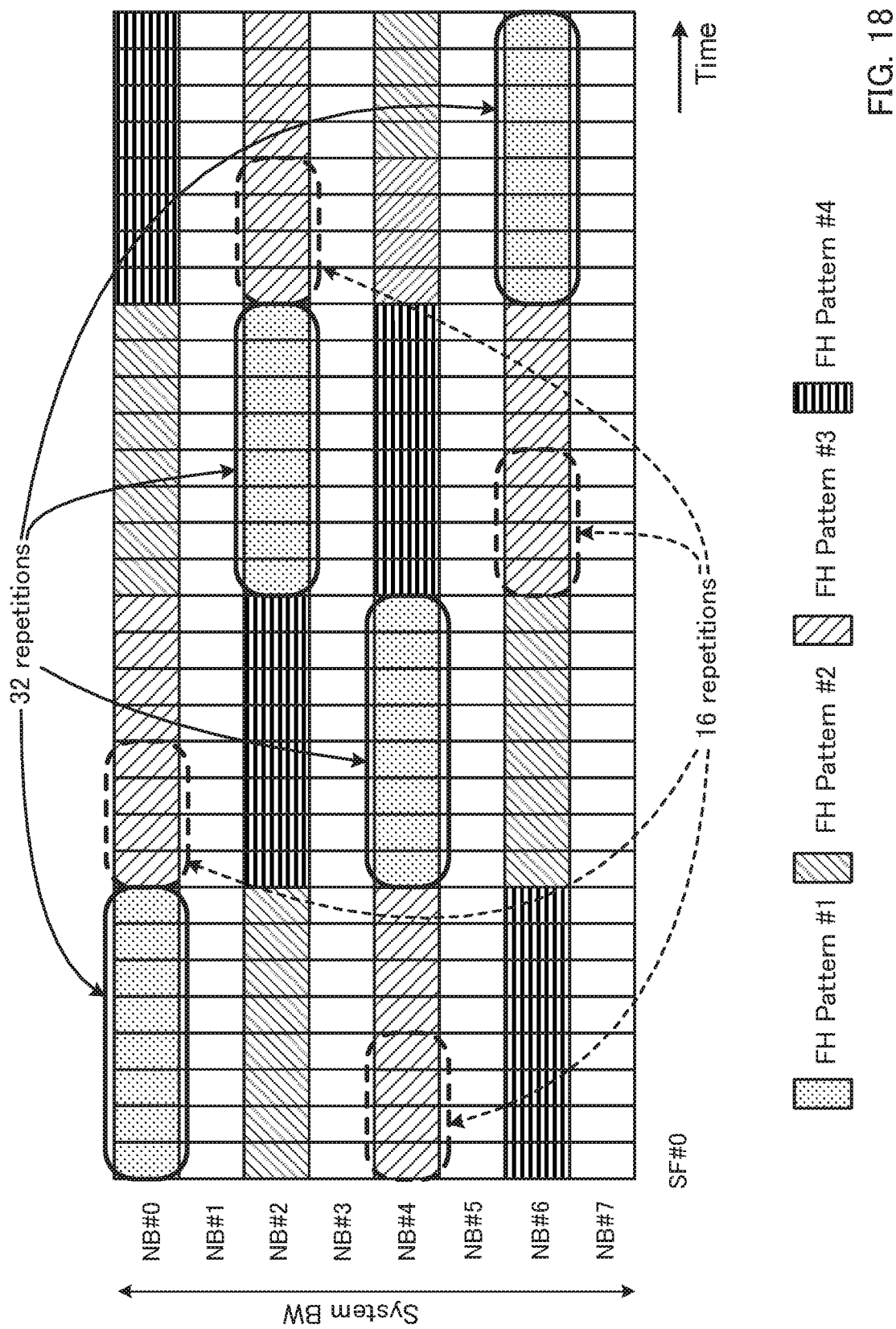
FIG. 18 is a diagram to show other examples of frequency hopping patterns according to the Third Example in accordance with embodiments of the invention.

In the above-described frequency hopping patterns, frequency hopping sets that are designed so that the PDSCH of the minimum number of repetitions (for example, 8) is allocated to at least two narrow bands are configured, and Y is fixed regardless of the number of repetitions. By contrast with this, as shown in FIG. 18, frequency hopping sets that are designed so that the PDSCH of the maximum number of repetitions (for example, 32) is allocated to all narrow bands configured by higher layer signaling may be configured as well. In this case, the number of repetitions can be changed by making Y smaller. For example, in FIG. 18, Y=8 when the maximum number of repetitions is 32. Meanwhile, the number of repetitions can be made 16 by making Y=4.

Note that, in FIG. 18, Y is determined by the number of times the PDSCH is repeated and the number of narrow bands configured by higher layer signaling. For example, when 4 narrow bands are configured by higher layer signaling as shown in FIG. 8, Y=8 (=32/4) if the number of repetitions is 32, or Y=4 (=16/4) if the number of repetitions is 16.

FOURTH EXAMPLE

According to a Fourth Example, an MTC terminal (user terminal) receives a PDSCH (downlink signal) that is transmitted in repetitions in a pre-determined frequency hopping pattern, and specifies the frequency hopping pattern that is applied to this PDSCH. To be more specific, the MTC terminal receives a starting index that indicates the narrow band (frequency block) where the PDSCH starts being allocated, and, based on this starting index, specifies the frequency hopping pattern that is applied to the PDSCH from the frequency hopping patterns that are determined in advance among a plurality of narrow bands that constitute the whole system band.

Here, in the pre-determined frequency hopping patterns, the narrow band to allocate a PDSCH (hereinafter referred to as an "allocating narrow band" (NB)) may be shifted every fixed number of subframe across a plurality of narrow bands that constitute the system band. The frequency hopping patterns that are determined in advance in the Fourth Example are formed with narrow bands that cover the whole system band, and thus different from those of the Third Example. Now, the Fourth Example will be described, primarily focusing on differences from the Third Example.

Figure 9:
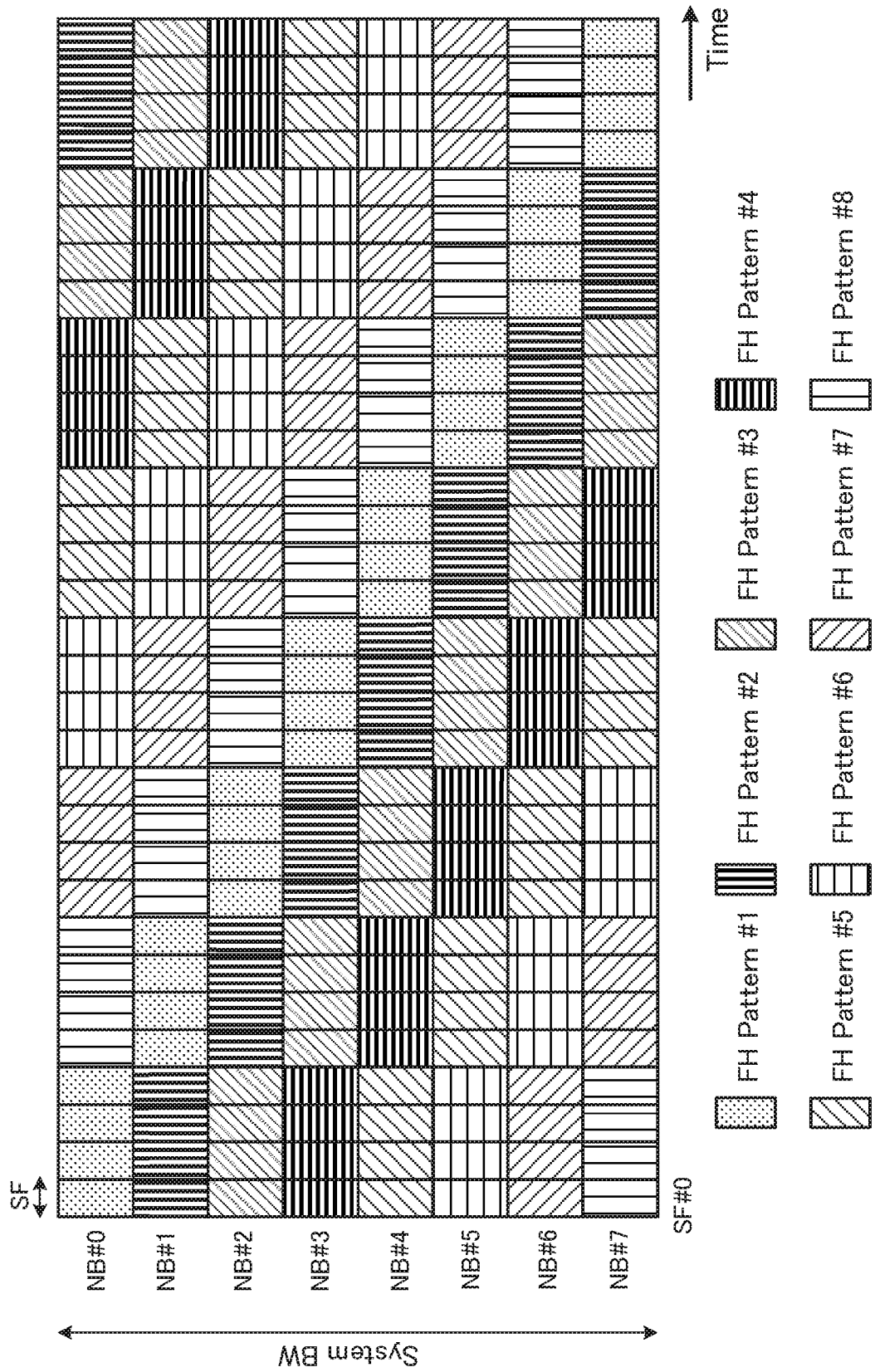
FIG. 9 is a diagram to show examples of frequency hopping patterns according to a Fourth Example in accordance with embodiments of the invention.

FIG. 9 is a diagram to show examples of frequency hopping patterns according to the Fourth Example. In FIG. 9, frequency hopping (FH) patterns #1 to #8 are pre-determined, and configured in the MTC terminal. Frequency hopping (FH) patterns #1 to #4 may be determined based on pre-determined parameters (such as information provided in higher layer signaling (for example, cell-specific information), fixed values, etc.).

As shown in FIG. 9, in frequency hopping patterns #1 to #8, allocating NBs are configured across the whole system band. Also, in frequency hopping patterns #1 to #8, the allocating NBs shift in the direction of frequency every fixed number of subframes (here, four SFs). For example, in frequency hopping pattern #1, NB #0 is the starting NB, and the allocating NBs shift by one by one every 4 subframes. Likewise, in frequency hopping patterns #2 to #8, NBs #1 to #7 are the starting NBs, and the allocating NBs shift one by one every 4 subframes.

In FIG. 9, an MTC terminal specifies the frequency hopping pattern applied to the PDSCH, from among frequency hopping patterns #1 to #8, based on the above starting index. To be more specific, the MTC terminal receives, via an MPDCCH, DCI that contains the starting index. For example, in FIG. 9, when the MTC terminal receives DCI that contains the starting index (NB #2) in subframe #0, the MTC terminal specifies frequency hopping pattern #3 based on this starting index.

According to the Fourth Example, frequency hopping patterns, which are formed with narrow bands that cover the whole system band, and in which allocating narrow bands are shifted every fixed number of subframes, are determined in advance. By using frequency hopping patterns that are determined in advance to prevent collisions, it is possible to prevent the collisions of PDSCH resources between MTC terminals while gaining a frequency diversity effect.

FIFTH EXAMPLE

According to a Fifth Example, as in the Fourth Example, an MTC terminal receives a starting index that indicates the narrow band (frequency block) where the PDSCH starts being allocated, and, based on this starting index, specifies the frequency hopping pattern that is applied to the PDSCH from the frequency hopping patterns that are determined in advance among a plurality of narrow bands that constitute the whole system band.

The frequency hopping patterns that are determined in advance in the Fifth Example are different from those of the Fourth Example in that a PDSCH-allocating narrow band (NB) is interleaved every fixed number of subframes across a plurality of narrow bands that constitute the system band. Now, the Fifth Example will be described, primarily focusing on differences from the Fourth Example.

Figure 10:
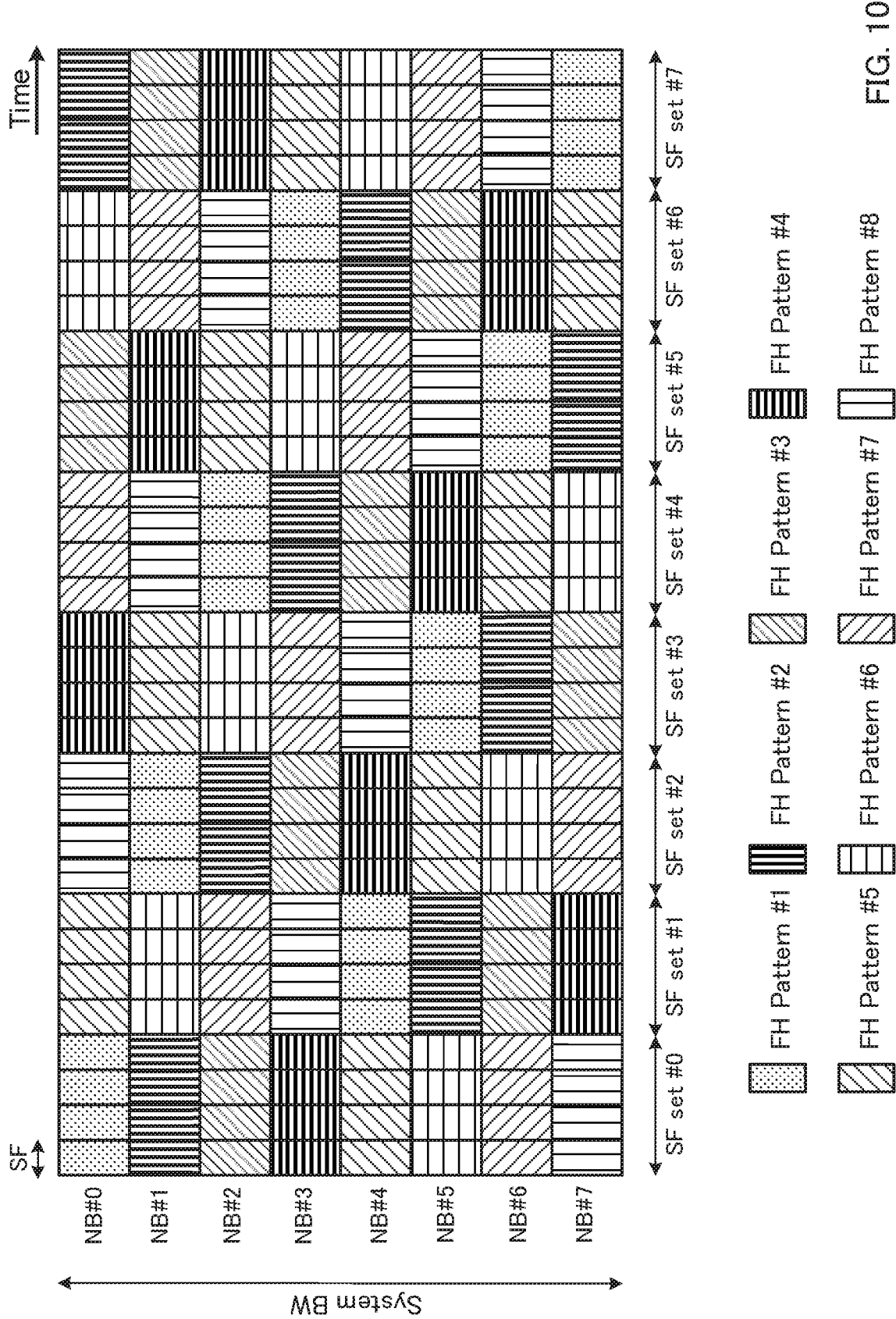
FIG. 10 is a diagram to show examples of frequency hopping patterns according to a Fifth Example in accordance with embodiments of the invention.

FIG. 10 is a diagram to show examples of frequency hopping patterns according to the Fifth Example. In FIG. 10, frequency hopping (FH) patterns #1 to #8 are pre-determined, and configured in the MTC terminal. Frequency hopping (FH) patterns #1 to #8 may be determined based on pre-determined parameters (such as information provided in higher layer signaling (for example, cell-specific information), fixed values, etc.).

As shown in FIG. 10, in frequency hopping patterns #1 to #8, allocating NBs are configured across the whole system band. Also, in frequency hopping patterns #1 to #8, the allocating NBs are interleaved every fixed number of subframes (here, four SFs). For example, in frequency hopping patterns #1 to #8, the allocating NBs are interleaved in accordance with equation 1:

$$\{y\} = 2 \cdot \mathrm{mod}(x, 4) + \lceil i/4 \rceil - 2 \quad \text{(Equation 1)}$$

Here, x is the index of a subframe set comprised of a certain number of subframes (here, four SFs). y is the index of an allocating NB to be interleaved every fixed number of subframes (here, four SFs). Furthermore, is the index of a frequency hopping (FH) pattern.

According to above equation 1, NB #0 is the allocating NB in frequency hopping (FH) pattern #1 in subframe (SF) set #0. Similarly, the allocating NBs in frequency hopping pattern #1 in subframe sets #1, #2, #3, #4, #5, #6 and #7 are NBs #5, #2, #6, #3, #7, #4 and #8, respectively. Similarly, the allocating NBs in frequency hopping patterns #2 to #8 in each subframe set can be determined by above equation 1.

In FIG. 10, an MTC terminal specifies the frequency hopping pattern that is applied to the PDSCH, from among frequency hopping patterns #1 to #8, based on the above starting index. To be more specific, the MTC terminal receives, via an MPDCCH, DCI that contains the starting index. For example, in FIG. 10, when the MTC terminal receives DCI that contains the starting index (NB #2) in subframe #0, the MTC terminal specifies frequency hopping pattern #3 based on this starting index.

According to the Fifth Example, frequency hopping patterns, which are formed with narrow bands that cover the whole system band, and in which allocating narrow bands are interleaved every fixed number of subframes, are determined in advance. By using frequency hopping patterns that are determined in advance to prevent collisions and that use interleaving, it is possible to prevent the collisions of PDSCH resources between MTC terminals while gaining a frequency diversity effect.

SIXTH EXAMPLE

According to a Sixth Example, as in the Fourth Example, an MTC terminal receives a starting index that indicates the narrow band (frequency block) where the PDSCH starts being allocated, and, based on this starting index, specifies the frequency hopping pattern that is applied to the PDSCH from the frequency hopping patterns that are determined in advance among a plurality of narrow bands that constitute the whole system band. Also, similar to the Fourth Example, in the frequency hopping patterns that are determined in advance in the Sixth Example, PDSCH-allocating NBs are shifted every fixed number of subframes across a plurality of narrow bands that constitute the system band.

Now, the Sixth Example is different from the Fourth Example in that a PDSCH-allocating NB is selected, from among a plurality of narrow bands included in a frequency hopping pattern, based on the frequency offset. Now, the Sixth Example will be described, primarily focusing on differences from the Fourth Example.

Figure 11:
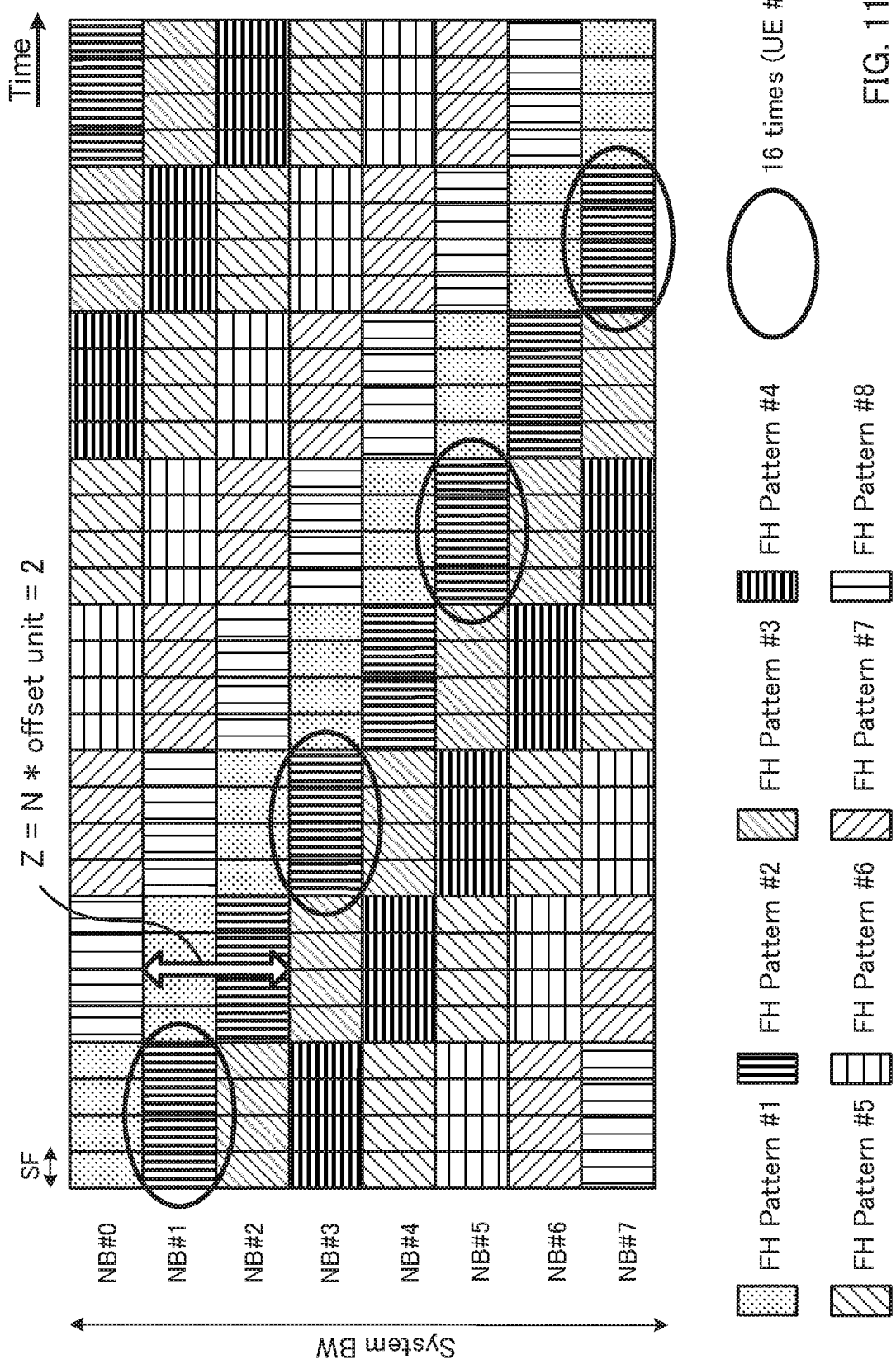
FIG. 11 is a diagram to show examples of frequency hopping patterns according to a Sixth Example in accordance with embodiments of the invention.

FIG. 11 is a diagram to show examples of frequency hopping patterns according to the Sixth Example. In FIG. 11, frequency hopping patterns #1 to #8 are determined in advance as in FIG. 9. For example, FIG. 11 assumes a case where the number of repetitions of the PDSCH for user terminal #1 is 16 and where frequency hopping pattern #2 is used.

As shown in FIG. 11, for the PDSCH for user terminal #1, NBs #1, #3, #5 and #7 are selected from the allocating NBs in frequency hopping pattern #2 (NB #1 to #7 and #0, which are shifted every 4 subframes) based on the frequency offset. Here, frequency offset (hopping offset) Z can be determined by, for example, equation 2:

$$Z = N \cdot \text{offset\_unit} \quad \text{(Equation 2)}$$

Also, offset_unit in equation 2 can be determined by, for example, equation 3:

Here, $N_{NB}$ is the number of NBs (in FIG. 11, 8). $R_{max}$ is the maximum number of repetitions for the PDSCH (in FIG. 11, 32). X is the number of times to repeat the PDSCH in the same narrow band (in FIG. 11, 4).

$$\text{offset\_unit} = \left\lfloor \frac{N_{NB}}{\left\lceil \frac{R_{max}}{X} \right\rceil} \right\rfloor \quad \text{(Equation 3)}$$

Also, N in equation 2 is a value that is unique to user terminal i, and can be determined by, for example, equation 4. Here, $R_i$ is the number of times the PDSCH for user terminal i is repeated.

$$N_i = \left\lfloor \frac{\left\lceil \frac{R_{max}}{X} \right\rceil}{\left\lceil \frac{R_i}{X} \right\rceil} \right\rfloor \quad \text{(Equation 4)}$$

In FIG. 11, offset_unit =1 and N=2, so that equation 2 gives Z=2. That is, in FIG. 11, NBs are selected, for every 2 NBs, from among the allocating NBs in frequency hopping pattern #2.

According to the Sixth Example, frequency hopping patterns, which are formed with narrow bands that cover the whole system band, and in which allocating narrow bands are shifted every fixed number of subframes, are determined in advance. Allocating NBs are selected, based on the frequency offset, from the allocating NBs of the frequency hopping patterns that are determined in advance to prevent collisions. Consequently, even when the number of repetitions is small, it is still possible to expand the intervals between NBs, so that it is possible to prevent the collisions of PDSCH resources between MTC terminals while gaining a frequency diversity effect.

SEVENTH EXAMPLE

According to a Seventh Example, as in the Fourth Example, an MTC terminal receives a starting index that indicates the narrow band (frequency block) where the PDSCH starts being allocated, and, based on this starting index, specifies the frequency hopping pattern that is applied to the PDSCH from the frequency hopping patterns that are determined in advance among a plurality of narrow bands that constitute the whole system band. Also, similar to the Fourth Example, in the frequency hopping patterns that are determined in advance in the Seventh Example, PDSCH-allocating NBs are shifted every fixed number of subframes across a plurality of narrow bands that constitute the system band.

Now, the Seventh Example is different from the Fourth Example in that a PDSCH-allocating NB is selected, from among a plurality of narrow bands included in a frequency hopping pattern, based on the time offset. Now, the Seventh Example will be described, primarily focusing on differences from the Fourth Example.

Figure 12:
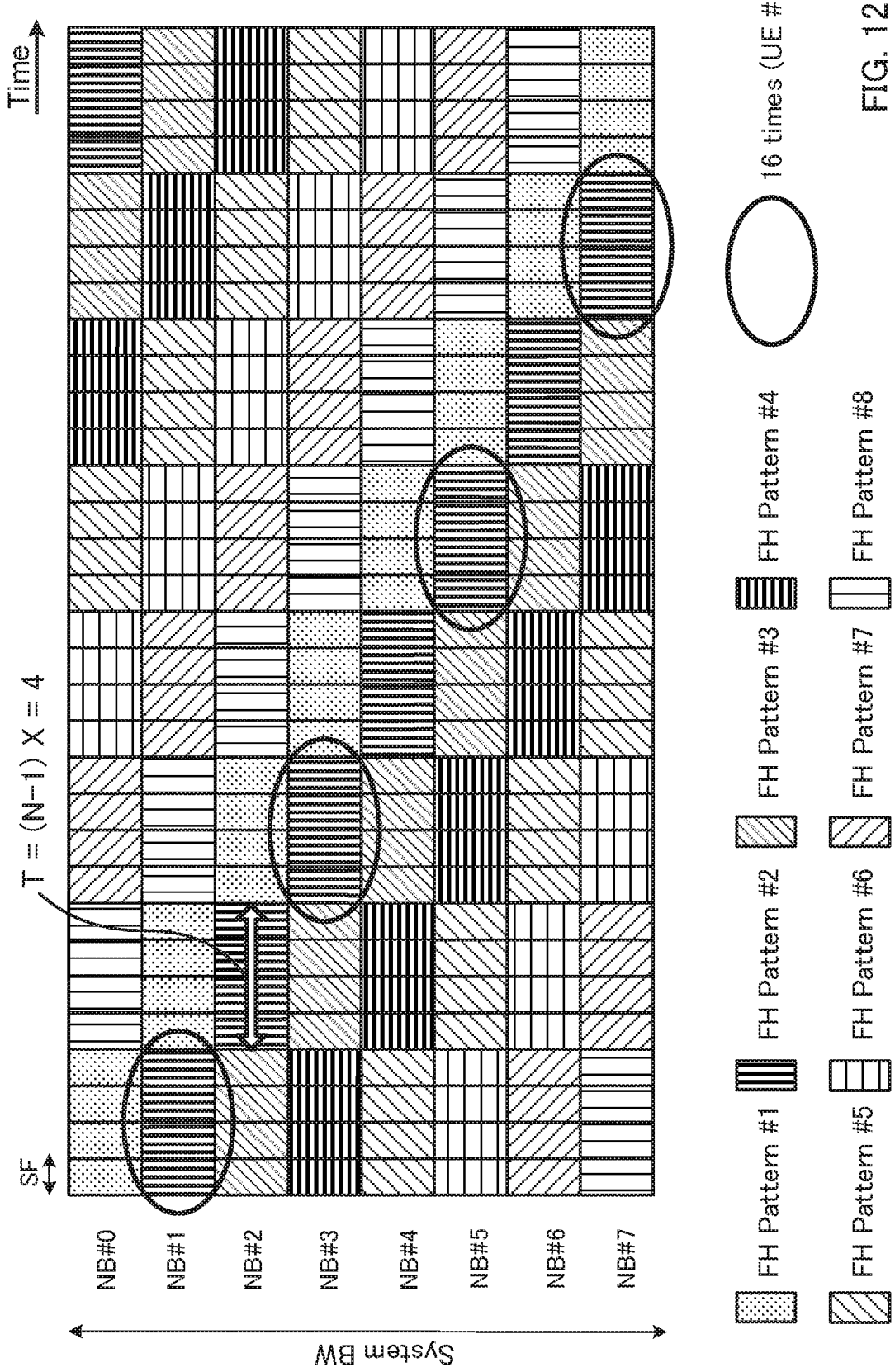
FIG. 12 is a diagram to show examples of frequency hopping patterns according to a Seventh Example in accordance with embodiments of the invention.

FIG. 12 is a diagram to show examples of frequency hopping patterns according to the Seventh Example. In FIG. 12, frequency hopping patterns #1 to #8 are determined in advance as in FIG. 9. For example, FIG. 12 assumes a case where the number of repetitions of the PDSCH for user terminal #1 is 16 and where frequency hopping pattern #2 is used.

As shown in FIG. 12, for the PDSCH for user terminal #1, NBs #1, #3, #5 and #7 are selected from the allocating NBs in frequency hopping pattern #2 (NB #1 to #7 and #0, which are shifted every 4 subframes) based on the time offset. Here, time offset (transmission time interval) T can be determined by, for example, equation 5:

$$T=(N-1)*X \quad \text{(Equation 5)}$$

N in equation 5 can be determined by, for example, equation 6. Note that the parameters that have been described above in relationship to equations 2 to 4 will not be explained here.

$$N = \left\lfloor \frac{\left\lfloor \frac{N_{NB}}{\left\lceil \text{offset\_unit} \right\rceil} \right\rfloor}{\left\lceil \frac{R}{X} \right\rceil} \right\rfloor \quad \text{(Equation 6)}$$

In FIG. 12, offset_unit =1 and N=2, so that equation 5 gives T=4. That is, NBs are selected at 4-subframes intervals from among the allocating NBs in frequency hopping pattern #2.

According to the Seventh Example, frequency hopping patterns, which are formed with narrow bands that cover the whole system band, and in which allocating narrow bands are shifted every fixed number of subframes, are determined in advance. Allocating NBs are selected, based on the time offset, from the allocating NBs of the frequency hopping patterns that are determined in advance to prevent collisions. Consequently, even when the number of repetitions is small, it is still possible to expand the intervals between NBs, so that it is possible to prevent the collisions of PDSCH resources between MTC terminals while gaining a frequency diversity effect.

(Radio Communication System)

The structure of the radio communication system according to one or more embodiments of the present invention will be described below. In this radio communication system, the radio communication methods according to the above-described embodiments of the present invention are employed. Note that the radio communication methods of the above-described embodiments may be applied individually or may be applied in combination. Here, although MTC terminals will be shown as examples of user terminals that are limited to using narrow bands as bands for use, one or more embodiments of the present invention is by no means limited to MTC terminals.

Figure 13:
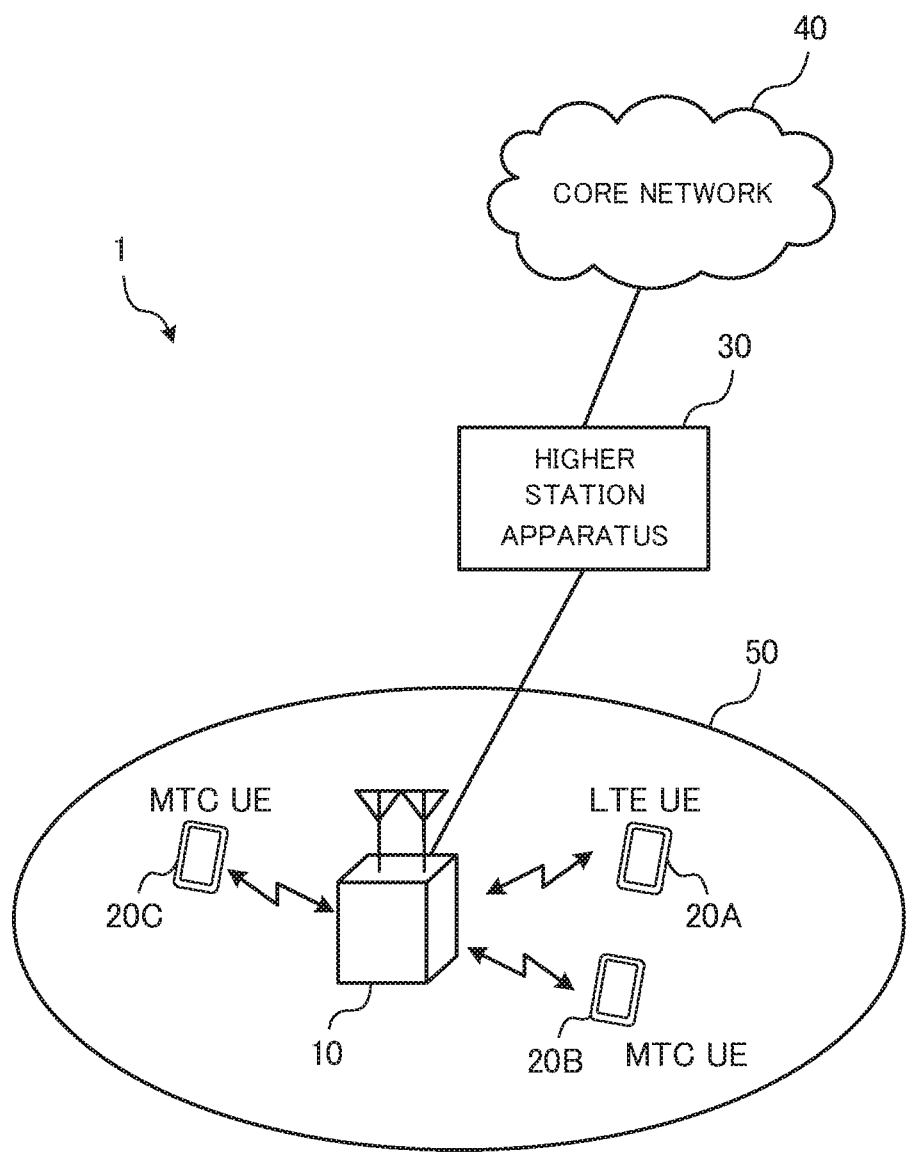
FIG. 13 is a diagram to show a schematic structure of a radio communication system according to embodiments of the present invention.

FIG. 13 is a diagram to show a schematic structure of the radio communication system according to one or more embodiments of the present invention. The radio communication system 1 shown in FIG. 13 is an example of employing an LTE system in the network domain of a machine-type communication (MTC) system. The radio communication system 1 can adopt carrier aggregation (CA) and/or dual connectivity (DC) to group a plurality of fundamental frequency blocks (component carriers) into one, where the LTE system band constitutes one unit. Also, although, in this LTE system, the system band is configured to maximum 20 MHz in both the downlink and the uplink, this configuration is by no means limiting. Note that the radio communication system 1 may be referred to as "SUPER 3G," "LTE-A" (LTE-Advanced), "IMT-Advanced," "4G," "5G," "FRA" (Future Radio Access) and so on.

The radio communication system 1 is comprised of a radio base station 10 and a plurality of user terminals 20A, 20B and 20C that are connected with the radio base station 10. The radio base station 10 is connected with a higher station apparatus 30, and connected with a core network 40 via the higher station apparatus 30. Note that the higher station apparatus 30 may be, for example, an access gateway apparatus, a radio network controller (RNC), a mobility management entity (MME) and so on, but is by no means limited to these.

A plurality of user terminal 20A, 20B and 20C can communicate with the radio base station 10 in a cell 50. For example, the user terminal 20A is a user terminal that supports LTE (up to Rel-10) or LTE-Advanced (including Rel-10 and later versions) (hereinafter referred to as an "LTE terminal"), and the other user terminals 20B and 20C are MTC terminals that serve as communication devices in MTC systems, and are limited to using partial narrow bands (frequency blocks) in a system band as bands for their use. Hereinafter the user terminals 20A, 20B and 20C will be simply referred to as "user terminals 20," unless specified otherwise.

Note that the MTC terminals 20B and 20C are terminals that support various communication schemes including LTE and LTE-A, and are by no means limited to stationary communication terminals such electric meters, gas meters, vending machines and so on, and can be mobile communication terminals such as vehicles. Furthermore, the user terminals 20 may communicate with other user terminals 20 directly, or communicate with other user terminals 20 via the radio base station 10.

In the radio communication system 1, as radio access schemes, Orthogonal Frequency Division Multiple Access (OFDMA) is applied to the downlink, and Single-Carrier Frequency Division Multiple Access (SC-FDMA) is applied to the uplink. OFDMA is a multi-carrier communication scheme to perform communication by dividing a frequency band into a plurality of narrow frequency bands (subcarriers) and mapping data to each subcarrier. SC-FDMA is a single-carrier communication scheme to mitigate interference between terminals by dividing the system band into bands formed with one or continuous resource blocks per terminal, and allowing a plurality of terminals to use mutually different bands. Note that the uplink and downlink radio access schemes are by no means limited to the combination of these.

In the radio communication system 1, a downlink shared channel (e.g., Physical Downlink Shared Channel (PDSCH)), which is used by each user terminal 20 on a shared basis, a broadcast channel (e.g., Physical Broadcast Channel (PBCH)), downlink L1/L2 control channels and so on are used as downlink channels. User data, higher layer control information and pre-determined System Information Blocks (SIBs) are communicated in the PDSCH. Also, the MIB (Master Information Block) is communicated in the PBCH.

The downlink L1/L2 control channels include a Physical Downlink Control Channel (PDCCH), an Enhanced Physical Downlink Control Channel (EPDCCH), a Physical Control Format Indicator Channel (PCFICH), a Physical Hybrid-ARQ Indicator Channel (PHICH) and so on. Downlink control information (DCI) including PDSCH and PUSCH scheduling information is communicated by the PDCCH. The number of OFDM symbols to use for the PDCCH is communicated by the PCFICH. HARQ delivery acknowledgement signals (ACKs/NACKs) in response to the PUSCH are communicated by the PHICH. The EPDCCH/MPDCCH is frequency-division-multiplexed with the PDSCH (downlink shared data channel) and used to communicate DCI and so on, like the PDCCH. The MPDCCH is transmitted in partial narrow bands (frequency blocks) in a system band.

In the radio communication system 1, an uplink shared channel (e.g., Physical Uplink Shared Channel (PUSCH)), which is used by each user terminal 20 on a shared basis, an uplink control channel (e.g., Physical Uplink Control Channel (PUCCH)), a random access channel (e.g., Physical Random Access Channel (PRACH)) and so on are used as uplink channels. User data and higher layer control information are communicated by the PUSCH. Also, downlink radio quality information (e.g., Channel Quality Indicator (CQI)), delivery acknowledgement signals and so on are communicated by the PUCCH. By means of the PRACH, random access preambles (RA preambles) for establishing connections with cells are communicated.

<Radio Base Station>

Figure 14:
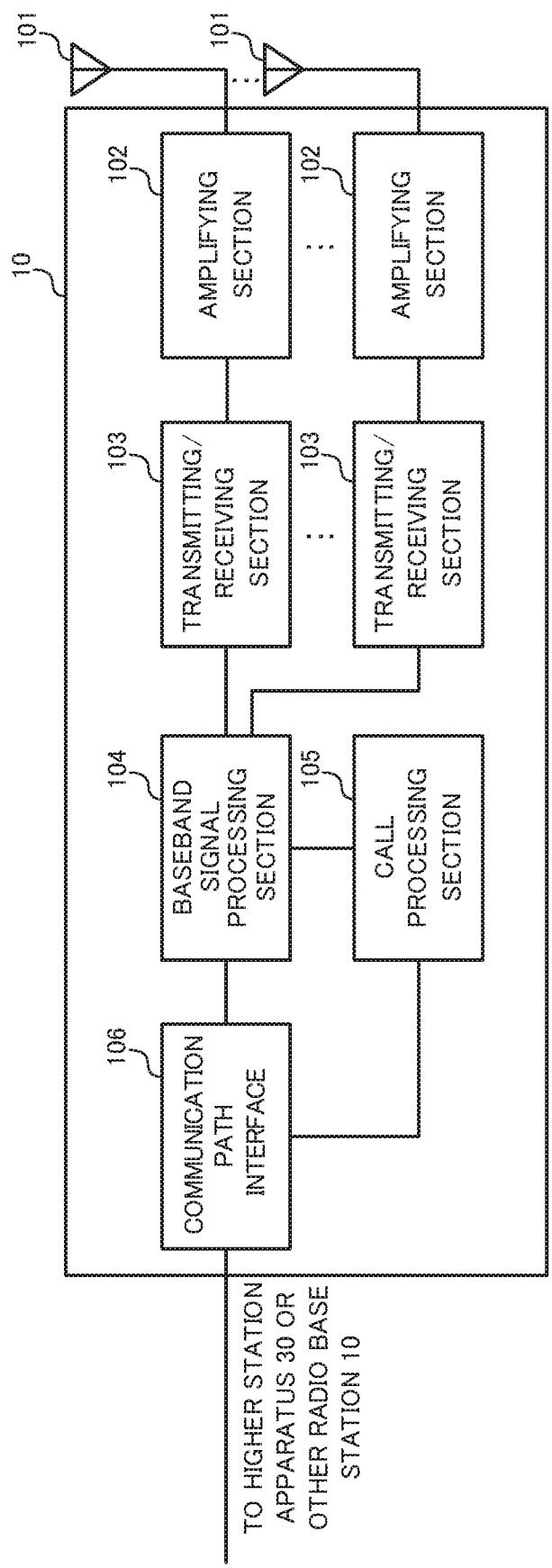
FIG. 14 is a diagram to show an example of an overall structure of a radio base station according to embodiments of the present invention.

FIG. 14 is a diagram to show an example of an overall structure of a radio base station according to one or more embodiments of the present invention. A radio base station 10 has a plurality of transmitting/receiving antennas 101, amplifying sections 102, transmitting/receiving sections 103, a baseband signal processing section 104, a call processing section 105 and a communication path interface 106. Note that the transmitting/receiving sections 103 are comprised of transmitting sections and receiving sections.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a Packet Data Convergence Protocol (PDCP) layer process, user data division and coupling, Radio Link Control (RLC) layer transmission processes such as an RLC retransmission control transmission process, Medium Access Control (MAC) retransmission control (for example, a Hybrid Automatic Repeat reQuest (HARQ) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

The transmitting/receiving sections 103 receive downlink signals, and, furthermore, transmit uplink signals. The downlink signals include downlink control signals (for example, the PDCCH/EPDCCH/MPDCCH), downlink data signals (for example, the PDSCH), downlink reference signals (for example, Channel State Information-Reference Signals (CSI-RSs)), Cell-specific Reference Signals (CRSs)), higher layer control signals, and so on. The uplink signals include uplink control signals (for example, the PUCCH), uplink data signals (for example, the PUSCH), uplink reference signals (for example, Sounding Reference Signals (SRSs), DeModulation-Reference Signals (DM-RSs)), higher layer control signals, and so on.

To be more specific, each transmitting/receiving section 103 converts baseband signals that are pre-coded and output from the baseband signal processing section 104 on a per antenna basis, into a radio frequency band. The radio frequency signals having been subjected to frequency conversion in the transmitting/receiving sections 103 are amplified in the amplifying sections 102, and transmitted from the transmitting/receiving antennas 101. The transmitting/receiving sections 103 can transmit and/or receive various signals in a narrow bandwidth (for example, 1.4 MHz) that is more limited than a system band (for example, one component carrier).

As would be understood by a person skilled in the art, the transmitting/receiving sections 103 may be any type of device capable of performing the transmission and reception functions, for example, transmitters/receivers, transmitting/receiving circuits, or transmitting/receiving devices.

Meanwhile, as for uplink signals, radio frequency signals that are received in the transmitting/receiving antennas 101 are each amplified in the amplifying sections 102. Each transmitting/receiving section 103 receives uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a pre-determined interface. Also, the communication path interface 106 may transmit and/or receive signals (backhaul signaling) with other radio base stations 10 via an inter-base station interface (for example, an interface in compliance with the Common Public Radio Interface (CPRI), such as optical fiber, the X2 interface, etc.).

Figure 15:
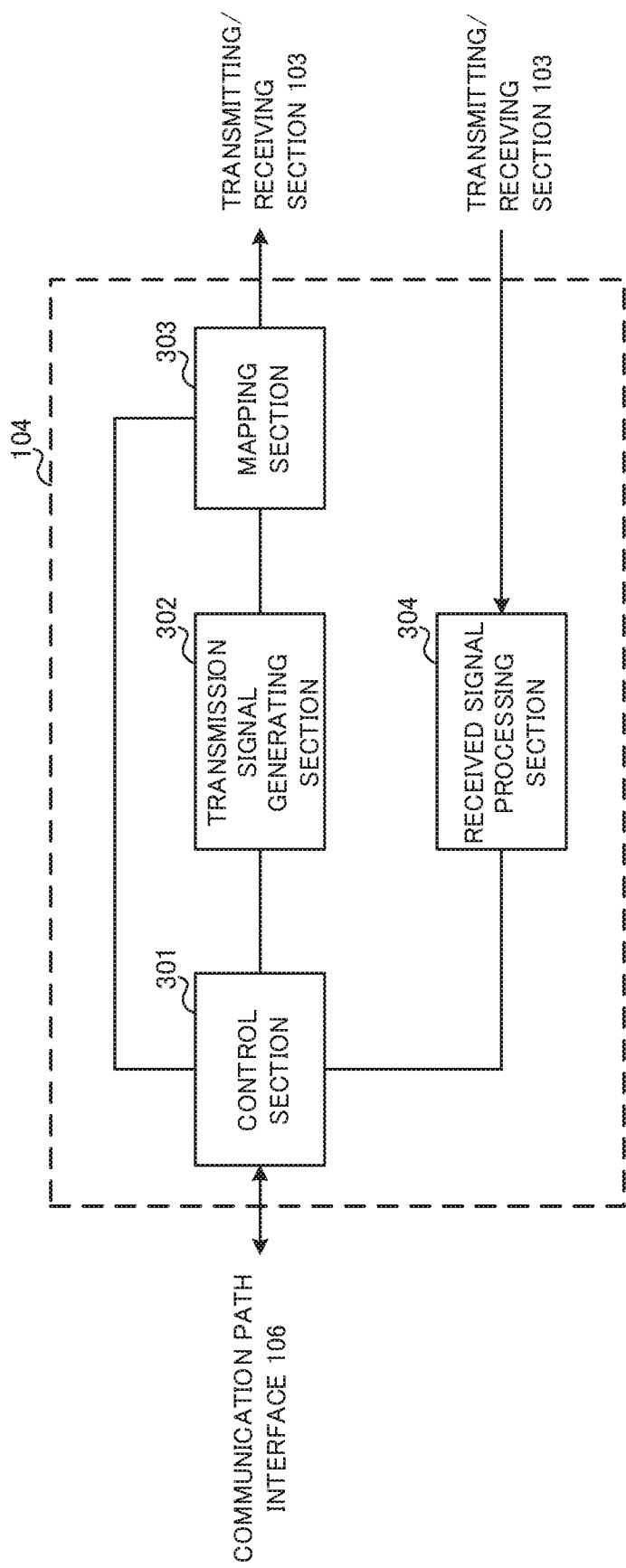
FIG. 15 is a diagram to show an example of a functional structure of a radio base station according to embodiments of the present invention.

FIG. 15 is a diagram to show an example of a functional structure of a radio base station according to the present embodiment. Note that, although FIG. 15 primarily shows functional blocks that pertain to characteristic parts of the present embodiment, the radio base station 10 has other functional blocks that are necessary for radio communication as well. As shown in FIG. 15, the baseband signal processing section 104 has a control section 301, a transmission signal generating section 302, a mapping section 303 and a received signal processing section 304.

The control section 301 controls the scheduling (for example, resource allocation) of downlink data signals (e.g., PDCCH), downlink control signals (at least one of the PDCCH, the EPDCCH and the MPDCCH). Also, the control section 301 controls the scheduling of system information, synchronization signals, and downlink reference signals (CRSs, CSI-RSs, DM-RSs and so on). Furthermore, the control section 301 controls the scheduling of uplink reference signals, uplink data signals (e.g., PUSCH), uplink control signals (e.g., PUCCH), random access preambles that are transmitted in the PRACH, and so on.

The control section 301 controls the transmission signal generating section 302 and the mapping section 303 to allocate various signals to narrow bands and transmit these to the user terminals 20. For example, the control section 301 controls downlink system information (e.g., MIB, SIBs, etc.), downlink control signals (e.g., MPDCCH), downlink data signals (e.g., PDSCH) and so on to be transmitted in narrow bands.

Also, the control section 301 controls the transmission signal generating section 302, the mapping section 303 and the transmitting/receiving section 103 to determine the frequency hopping pattern to apply to a downlink signal (for example, the PDSCH), and transmit the downlink signal by using the determined frequency hopping pattern.

To be more specific, the control section 301 selects the index (starting index) of the narrow band (NB) where the determined frequency hopping pattern starts. Also, the control section 301 exerts control so that DCI that contains this starting index is transmitted in a downlink control signal (e.g., MPDCCH). Note that the control section 301 may exert control so that higher layer control information to contain this starting index is transmitted.

For example, the control section 301 may determine the frequency hopping pattern based on a period X, in which transmission is repeated in the same narrow band (frequency block), a period Y, which is a total of period X and the period (for example, 1 ms) it takes to re-tune to another narrow band, and Z, which is the hopping offset between narrow bands. Furthermore, the control section 301 may determine the time offset with respect to the subframe where the determined frequency hopping pattern starts (First Example) and/or the frequency offset with respect to the narrow band indicated by the above starting index (Second Example).

Here, the control section 301 may exert control so that information to represent the above time offset is placed in higher layer control information and transmitted to the user terminals 20 or placed in DCI and transmitted to the user terminals 20 in a downlink control signal (e.g., MPDCCH). Alternatively, the information to represent the above time offset may be configured in the user terminals 20 in advance.

Also, the control section 301 may determine the frequency hopping pattern to apply to a downlink signal (for example, the PDSCH) for a user terminal 20 from the frequency hopping patterns that are determined in advance among a plurality of frequency blocks configured by higher layer signaling (see frequency hopping patterns #1 to #4 in FIG. 8) (Third Example). Furthermore, the control section 301 may control the allocation of downlink signals to radio resources by using frequency hopping sets that are designed so that the downlink signal of the minimum number of repetitions is allocated to at least two frequency blocks (see FIG. 8).

Also, the control section 301 may determine the frequency hopping pattern to apply to a downlink signal (for example, the PDSCH) for a user terminal 20 from the frequency hopping patterns that are determined in advance among a plurality of frequency blocks that constitute the system band (see frequency hopping patterns #1 to #8 in FIGS. 9 to 12) (Fourth to Seventh Examples).

Furthermore, the control section 301 may exert control so that a downlink signal is mapped to a narrow band that is selected from a plurality of narrow bands included in a frequency hopping pattern based on a frequency offset (Sixth Example) or a time offset (Seventh Example).

As would be understood by a person skilled in the art, the control section 301 may be any type of device capable of performing the control function, for example, a processor, a controller, a control circuit, or a control device.

The transmission signal generating section 302 generates downlink signals based on commands from the control section 301 and outputs these signals to the mapping section 303. For example, the transmission signal generating section 302 generates downlink grants (downlink assignments), which report downlink data signal allocation information, and uplink grants, which report uplink data signal allocation information, based on commands from the control section 301.

Also, the transmission signal generating section 302 generates a downlink control signal (e.g., MPDCCH) that contains delivery acknowledgment information in response to an uplink data signal (e.g., PUSCH) based on a command from the control section 301.

For the transmission signal generating section 302, a signal generator, a signal generating circuit or a signal generating device that can be described based on common understanding of the technical field to which one or more embodiments of the present invention pertain can be used.

The mapping section 303 maps the downlink signals generated in the transmission signal generating section 302 to pre-determined narrow band radio resources (for example, maximum 6 resource blocks) based on commands from the control section 301, and outputs these to the transmitting/receiving sections 103.

To be more specific, the mapping section 303 maps downlink signals to radio resources in pre-determined narrow bands following the frequency hopping patterns determined in the control section 301. For the mapping section 303, mapper, a mapping circuit or a mapping device that can be described based on common understanding of the technical field to which one or more embodiments of the present invention pertain can be used.

The received signal processing section 304 performs receiving processes (for example, demapping, demodulation, decoding and so on) of received signals that are input from the transmitting/receiving sections 103. Here, the received signals include, for example, uplink signals transmitted from user terminal 20 (uplink data signals (e.g., PUSCH), uplink control signals (e.g., PUCCH), uplink reference signals (e.g., SRSs, DMRSs, etc.), higher layer control signals, etc.). The received signal processing section 304 outputs the received information to the control section 301.

Also, by using the received signals, the received signal processing section 304 may measure the received power (for example, Reference Signal Received Power (RSRP)), the received quality (for example, Reference Signal Received Quality (RSRQ)), channel states and so on. The measurement results may be output to the control section 301.

The receiving process section 304 can be constituted by a signal processor, a signal processing circuit or a signal processing device, and a measurer, a measurement circuit or a measurement device that can be described based on common understanding of the technical field to which one or more embodiments of the present invention pertain.

<User Terminal>

Figure 16:
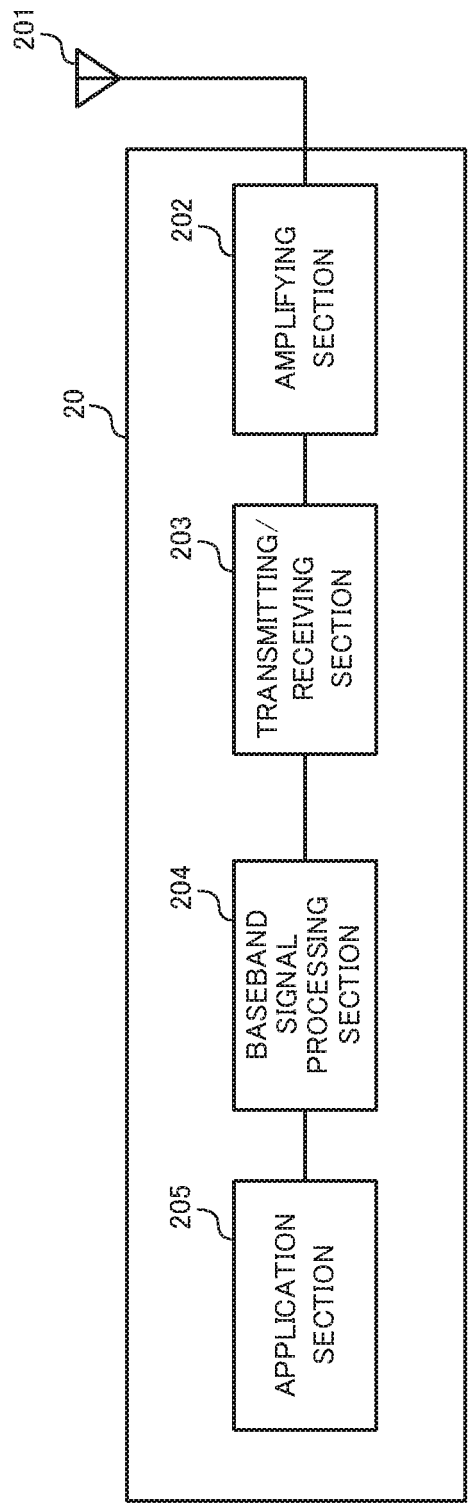
FIG. 16 is a diagram to show an example of an overall structure of a user terminal according to embodiments of the present invention.

FIG. 16 is a diagram to show an example of an overall structure of a user terminal according to the present embodiment. Note that, although not described in detail herein, normal LTE terminals may operate to act as MTC terminals. A user terminal 20 has a transmitting/receiving antenna 201, an amplifying section 202, a transmitting/receiving section 203, a baseband signal processing section 204 and an application section 205. Note that, the transmitting/receiving section 203 is comprised of a transmitting section and a receiving section. Also, the user terminal 20 may have a plurality of transmitting/receiving antennas 201, amplifying sections 202, transmitting/receiving sections 203 and/or others.

A radio frequency signal that is received in the transmitting/receiving antenna 201 is amplified in the amplifying section 202. The transmitting/receiving section 203 receives downlink signals amplified in the amplifying section 202 (including downlink control signals (e.g., PDCCH/EPDCCH/MPDCCH), downlink data signals (e.g., PDSCH), downlink reference signals (e.g., CSI-RSs, CRSS, etc.) and so on. The received signals are subjected to frequency conversion and converted into the baseband signal in the transmitting/receiving section 203, and output to the baseband signal processing section 204.

To be more specific, the transmitting/receiving section 203 receives a starting index, which indicates the narrow band (frequency block) where a downlink signal (for example, the PDSCH) starts being allocated. This starting index may be included in DCI that is communicated in a downlink control signal (e.g., MPDCCH), or may be included in higher layer control information.

Also, the transmitting/receiving section 203 may receive information that represents the time offset with respect to the subframe where the determined frequency hopping pattern starts (First Example) and/or the frequency offset with respect to the narrow band indicated by the above starting index (Second Example). Note that the information to represent the time offset and/or the frequency offset may be included in higher layer control information, or may be included in DCI that is communicated in a downlink control signal (MPDCCH).

Furthermore, the transmitting/receiving section 203 transmits uplink signals (including uplink control signals (e.g., PUCCH), uplink data signals (e.g., PUSCH), uplink reference signals (e.g., DM-RSs, SRSs, etc.) and so on) that are output from the baseband signal processing section 204. As would be understood by a person skilled in the art, the transmitting/receiving sections 203 may be any type of device capable of performing the transmission and receiving functions, for example, transmitters/receivers, transmitting/receiving circuits, or transmitting/receiving devices.

The baseband signal processing section 204 performs receiving processes for the baseband signal that is input, including an FFT process, error correction decoding, a retransmission control receiving process and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to each transmitting/receiving section 203. The baseband signal that is output from the baseband signal processing section 204 is converted into a radio frequency band in the transmitting/receiving section 203. The radio frequency signal that is subjected to frequency conversion in the transmitting/receiving section 203 is amplified in the amplifying section 202, and transmitted from the transmitting/receiving antenna 201.

Figure 17:
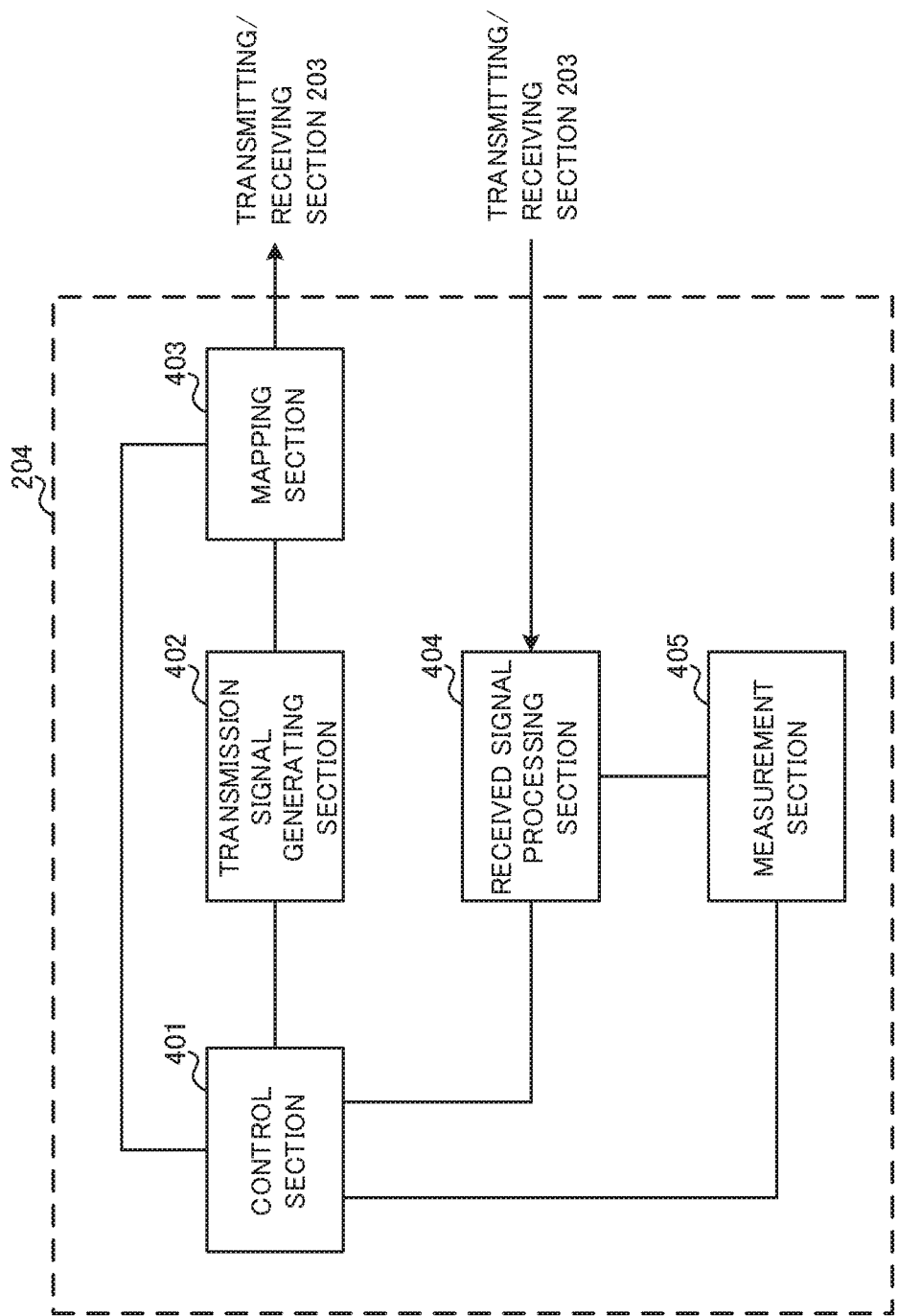
FIG. 17 is a diagram to show an example of a functional structure of a user terminal according to embodiments of the present invention.

FIG. 17 is a diagram to show an example of a functional structure of a user terminal according to the present embodiment. Note that, although FIG. 17 primarily shows functional blocks that pertain to characteristic parts of the present embodiment, the user terminal 20 has other functional blocks that are necessary for radio communication as well. As shown in FIG. 17, the baseband signal processing section 204 provided in the user terminal 20 has a control section 401, a transmission signal generating section 402, a mapping section 403, a received signal processing section 404 and a measurement section 405.

The control section 401 controls the transmission signal generating section 402 and the mapping section 403. The control section 401 acquires the downlink control signals (e.g., PDCCH/EPDCCH/MPDCCH) and downlink data signals (e.g., PDSCH), transmitted from the radio base station 10, from the received signal processing section 404. The control section 401 controls the generation of uplink control signals (e.g., PUCCH) and uplink data signals (e.g., PUSCH) based on the downlink control signals, the results of deciding whether or not retransmission control is necessary for the downlink data signals, and so on.

Furthermore, the control section 401 may control the receiving signal generating section 404 and the transmitting/receiving section 203 to specify the frequency hopping pattern to applied a downlink signal (for example, the PDSCH), and receive downlink signals by using the frequency hopping pattern specified. To be more specific, the control section 401 specifies the frequency hopping pattern applied to the downlink signal based on the index (starting index) of the narrow band (NB) where the frequency hopping pattern is started.

For example, the control section 401 may specify the frequency hopping pattern that is applied to a downlink signal based on the time offset with respect to the subframe where the downlink signal (for example, the PDSCH) starts being allocated (First Example) and/or based on the frequency offset with respect to the narrow band (frequency block) indicated by the above starting index (Second Example).

Furthermore, based on the above starting index, the control section 401 may specify the frequency hopping pattern that is applied to a downlink signal (for example, the PDSCH) across a plurality of narrow bands (frequency blocks) configured by higher layer signaling (Third Example). Here, in this frequency hopping pattern, the narrow bands to allocate the downlink signal may be interleaved every pre-determined number of subframes, across a plurality of narrow bands configured by higher layer signaling (see FIG. 8). Furthermore, in this frequency hopping pattern, frequency hopping sets that are designed so that the downlink signal of the minimum number of repetitions is allocated to at least two frequency blocks may be configured (see FIG. 8).

Furthermore, the control section 401 may specify the frequency hopping pattern that is applied to a downlink signal (for example, the PDSCH), based on the above starting index, among a plurality of narrow bands (frequency blocks) that constitute the whole system band (Fourth to Seventh Examples).

Here, in this frequency hopping pattern, the narrow bands to allocate the downlink signal may be shifted every pre-determined number of subframes, across the narrow bands constituting the whole system band (Fourth Example, Sixth and Seventh Examples). In this case, the control section 301 specify the narrow bands to allocate the downlink signal, from among a plurality of narrow bands included in the frequency hopping pattern, based on a frequency offset (Sixth Example) or a time offset (Seventh Example).

Furthermore, in this frequency hopping pattern, the narrow bands to allocate the downlink signal may be interleaved every pre-determined number of subframes, across the narrow bands constituting the whole system band (Fifth Example).

As would be understood by a person skilled in the art, the control section 401 may be any type of device capable of performing the control function, for example, a processor, a controller, a control circuit, or a control device. Note that, the control section 401, combined with the measurement section 405, may constitute the measurement section according to one or more embodiments of the present invention.

The transmission signal generating section 402 generates uplink signals based on commands from the control section 401, and outputs these signals to the mapping section 403. For example, the transmission signal generating section 402 generates an uplink control signal (e.g., PUCCH), which includes uplink control information (UCI), based on a command from the control section 401. The UCI may include at least one of delivery acknowledgment information (e.g., HARQ-ACK), channel state information (CSI) and a scheduling request (SR).

Also, the transmission signal generating section 402 generates an uplink data signal (e.g., PUSCH) based on a command from the control section 401. For example, when an uplink grant is included in a downlink control signal that is reported from the radio base station 10, the control section 401 commands the transmission signal generating section 402 to generate an uplink data signal.

For the transmission signal generating section 402, a signal generator, a signal generating circuit or a signal generating device that can be described based on common understanding of the technical field to which one or more embodiments of the present invention pertain can be used.

The mapping section 403 maps the uplink signals generated in the transmission signal generating section 402 to radio resources (maximum 6 resource blocks) based on commands from the control section 401, and outputs these to the transmitting/receiving sections 203. For the mapping section 403, mapper, a mapping circuit or a mapping device that can be described based on common understanding of the technical field to which one or more embodiments of the present invention pertain can be used.

The received signal processing section 404 performs receiving processes (for example, demapping, demodulation, decoding and so on) of received signals that are input from the transmitting/receiving sections 203. Here, the received signals include, for example, downlink signals transmitted from the radio base station 10 (downlink control signals (e.g., PDCCH/EPDCCH/MPDCCH), downlink data signals (e.g., PDSCH) and so on), higher layer control signals and so on.

The received signal processing section 404 outputs the received information to the control section 401. The received signal processing section 404 outputs, for example, broadcast information, system information, RRC signaling, DCI and so on, to the control section 401. Also, the received signal processing section 404 outputs the received signals, the signals after the receiving processes and so on to the measurement section 405.

For the received signal processing section 404, a signal processor, a signal processing circuit or a signal processing device that can be described based on common understanding of the technical field to which one or more embodiments of the present invention pertain can be used. Also, the received signal processing section 404 can constitute the receiving section according to one or more embodiments of the present invention.

The measurement section 405 measures the CSI of a narrow band (frequency block), which is frequency-hopped in a pre-determined cycle, based on commands from the control section 401. The CSI includes at least one of a rank indicator (RI), a channel quality indicator (CQI) and a precoding matrix indicator (PMI). Also, the measurement section 405 may measure the received power (e.g., RSRP), the receive quality (e.g., RSRQ), and so on, by using received signals. Note that the processing results and the measurement results may be output to the control section 401.

For the received signal processing section 404, a signal processor/measurer, a signal processing/measurement circuit or a signal processing/measurement device that can be described based on common understanding of the technical field to which one or more embodiments of the present invention pertain can be used.

Note that the block diagrams that have been used to describe the above embodiments show blocks in functional units. These functional blocks (components) may be implemented in arbitrary combinations of hardware and software. Also, the means for implementing each functional block is not particularly limited. That is, each functional block may be implemented with one physically-integrated device, or may be implemented by connecting two physically-separate devices via radio or wire and using these multiple devices.

For example, part or all of the functions of the radio base station 10 and the user terminal 20 may be implemented by using hardware such as an Application-Specific Integrated Circuit (ASIC), a Programmable Logic Device (PLD), an Field Programmable Gate Array (FPGA) and so on. Also, the radio base stations 10 and user terminals 20 may be implemented with a computer device that includes a processor (CPU), a communication interface for connecting with networks, a memory and a computer-readable storage medium that holds programs. That is, the radio base stations and user terminals according to one or more embodiments of the present invention may function as computers that execute the processes of the radio communication method according to one or more embodiments of the present invention.

Here, the processor and the memory are connected with a bus for communicating information. Also, the computer-readable recording medium is a storage medium such as, for example, a flexible disk, an opto-magnetic disk, a Read Only Memory (ROM), an Erasable Programmable ROM (EPROM), a Compact Disc-ROM (CD-ROM), a Random Access Memory (RAM), a hard disk and so on. Also, the programs may be transmitted from the network through, for example, electric communication channels. Also, the radio base stations 10 and user terminals 20 may include input devices such as input keys and output devices such as displays.

The functional structures of the radio base stations 10 and user terminals 20 may be implemented with the above-described hardware, may be implemented with software modules that are executed on the processor, or may be implemented with combinations of both. The processor controls the whole of the user terminals 20 by running an operating system. Also, the processor reads programs, software modules and data from the storage medium into the memory, and executes various types of processes.

Here, these programs have only to be programs that make a computer execute each operation that has been described with the above embodiments. For example, the control section 401 of the user terminals 20 may be stored in the memory and implemented by a control program that operates on the processor, and other functional blocks may be implemented likewise.

Also, software and commands may be transmitted and received via communication media. For example, when software is transmitted from a website, a server or other remote sources by using wired technologies such as coaxial cables, optical fiber cables, twisted-pair cables and digital subscriber lines (DSL) and/or wireless technologies such as infrared radiation, radio and microwaves, these wired technologies and/or wireless technologies are also included in the definition of communication media.

Note that the terminology used in this description and the terminology that is needed to understand this description may be replaced by other terms that convey the same or similar meanings. For example, "channels" and/or "symbols" may be replaced by "signals" (or "signaling"). Also, "signals" may be "messages." Furthermore, "component carriers" (CCs) may be referred to as "carrier frequencies," "cells" and so on.

Also, the information and parameters described in this description may be represented in absolute values or in relative values with respect to a pre-determined value, or may be represented in other information formats. For example, radio resources may be specified by indices.

The information, signals and/or others described in this description may be represented by using a variety of different technologies. For example, data, instructions, commands, information, signals, bits, symbols and chips, all of which may be referenced throughout the description, may be represented by voltages, currents, electromagnetic waves, magnetic fields or particles, optical fields or photons, or any combination of these.

The examples/embodiments illustrated in this description may be used individually or in combinations, and the mode of may be switched depending on the implementation. Also, a report of pre-determined information (for example, a report to the effect that "X holds") does not necessarily have to be sent explicitly, and can be sent implicitly (by, for example, not reporting this piece of information).

Reporting of information is by no means limited to the examples/embodiments described in this description, and other methods may be used as well. For example, reporting of information may be implemented by using physical layer signaling (for example, Downlink Control Information (DCI) and Uplink Control Information (UCI)), higher layer signaling (for example, Radio Resource Control (RRC) signaling, Medium Access Control (MAC) signaling, and broadcast information (e.g., Master Information Block (MIB) and System Information Blocks (SIBs))), other signals or combinations of these. Also, RRC signaling may be referred to as "RRC messages," and can be, for example, an RRC connection setup message, RRC connection reconfiguration message, and so on.

The examples/embodiments illustrated in this description may be applied to Long Term Evolution (LTE), LTE-Advanced (LTE-A), SUPER 3G, IMT-Advanced, 4G, 5G, Future Radio Access (FRA), CDMA 2000, UMB (Ultra Mobile Broadband), IEEE 802.11 (Wi-Fi), IEEE 802.16 (WiMAX), IEEE 802.20, Ultra-WideBand (UWB), Bluetooth (registered trademark), and other adequate systems, and/or next-generation systems that are enhanced based on these.

The order of processes, sequences, flowcharts and so on that have been used to describe the examples/embodiments herein may be re-ordered as long as inconsistencies do not arise. For example, although various methods have been illustrated in this description with various components of steps in exemplary orders, the specific orders that illustrated herein are by no means limiting.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A user terminal comprising:
a receiver that receives a downlink signal that is transmitted in repetitions over a plurality of subframes using narrow bands to which frequency hopping is applied for every given number of subframes; and
a processor that:
specifies the narrow bands to which frequency hopping is applied based on:
a starting index that indicates a first narrow band in the narrow bands where the downlink signal is transmitted in a first subframe of the plurality of subframes,
a frequency offset that is a shift in a frequency direction from the first narrow band to a next frequency-hopped narrow band,
a total number of narrow bands in a system band,
a number of the narrow bands to which the frequency hopping is applied,
a number of the transmitted repetitions in a narrow band of the narrow bands, and
a total number of repetitions; and
causes the receiver to receive the downlink signal using the specified narrow bands,
wherein each of the narrow bands is a part of the system band,
wherein the user terminal communicates using the narrow bands only, and
wherein the downlink signal starts being allocated to the first narrow band.

2. The user terminal according to claim 1, wherein the receiver receives information that represents the frequency offset via higher layer signaling.

3. The user terminal according to claim 2, wherein the receiver receives downlink control information that contains the starting index.

4. The user terminal according to claim 2, wherein the receiver receives the number of the narrow bands to which frequency hopping is applied via higher layer signaling.

5. The user terminal according to claim 2, wherein the downlink signal is at least one of a downlink shared channel and a downlink control channel.

6. The user terminal according to claim 1, wherein the receiver receives downlink control information that contains the starting index.

7. The user terminal according to claim 6, wherein the receiver receives the number of the narrow bands to which frequency hopping is applied via higher layer signaling.

8. The user terminal according to claim 6, wherein the downlink signal is at least one of a downlink shared channel and a downlink control channel.

9. The user terminal according to claim 1, wherein the receiver receives the number of the narrow bands to which the frequency hopping is applied via higher layer signaling.

10. The user terminal according to claim 9, wherein the downlink signal is at least one of a downlink shared channel and a downlink control channel.

11. The user terminal according to claim 1, wherein the downlink signal is at least one of a downlink shared channel and a downlink control channel.

12. A radio base station comprising:
a transmitter that transmits, to a user terminal, a downlink signal, in repetitions over a plurality of subframes, using narrow bands to which frequency hopping is applied for every given number of subframes; and
a processor that:
determines the narrow bands to which frequency hopping is applied based on:
a starting index that indicates a first narrow band in the narrow band where the downlink signal is transmitted in a first subframe of the plurality of subframes,
a frequency offset that is a shift in a frequency direction from the first narrow band to a next frequency-hopped narrow band,
a total number of narrow bands in a system band,
a number of the narrow bands to which the frequency hopping is applied,
a number of the transmitted repetitions in a narrow band of the narrow bands, and
a total number of repetitions; and
causes the transmitter to transmit the downlink signal using the determined narrow bands,
wherein each of the narrow bands is a part of the system band,
wherein the user terminal communicates using the narrow bands only, and
wherein the downlink signal starts being allocated to the first narrow band.

13. A radio communication method for a user terminal comprising:
receiving, from a base station, a downlink signal that is transmitted in repetitions over a plurality of subframes in narrow bands to which frequency hopping is applied for every given number of subframes; and
specifying the narrow bands to which frequency hopping is applied based on:
a starting index that indicates a first narrow band in the narrow bands where the downlink signal is transmitted in a first subframe of the plurality of subframes,
a frequency offset that is a shift in a frequency direction from the first narrow band to a next frequency-hopped narrow band,
a total number of narrow bands in a system band,
a number of the narrow bands to which the frequency hopping is applied,
a number of the transmitted repetitions in a narrow band of the narrow bands, and
a total number of repetitions,
wherein the receiving receives the downlink signal using the specified narrow bands,
wherein each of the narrow bands is a part of the system band,
wherein the user terminal communicates using the narrow bands only, and
wherein the downlink signal starts being allocated to the first narrow band.

* * * * *